United States Patent [19]

Baichtal et al.

[11] 4,178,478

[45] Dec. 11, 1979

[54] SUBSCRIBER TERMINAL FOR USE IN A TDM SWITCHING SYSTEM

[75] Inventors: James R. Baichtal; John C. McDonald, both of Los Altos; Bradley A. Helliwell, Los Gatos; Alexander C. Ling, Mountain View; Craig D. Schaffter, Sunnyvale, all of Calif.

[73] Assignee: TRW, Inc., Los Angeles, Calif.

[21] Appl. No.: 875,493

[22] Filed: Feb. 6, 1978

[51] Int. Cl.$^2$ .......................................... H04Q 11/04
[52] U.S. Cl. ............................................. 179/15 AQ
[58] Field of Search ........ 179/15 AQ, 15 AT, 18 FC, 179/15 BY

[56] References Cited

U.S. PATENT DOCUMENTS

| 3,514,541 | 5/1970 | Inose et al. | 179/15 AQ |
|---|---|---|---|
| 3,912,873 | 10/1975 | Skaperda | 179/18 FC |
| 4,069,399 | 1/1978 | Barrett et al. | 179/15 AL |

OTHER PUBLICATIONS

Special Issue on Telecommunications Circuit Switching, *Proceedings of the IEEE*, Sep. 1977, pp. 1235-1390.

*Primary Examiner*—Thomas W. Brown
*Attorney, Agent, or Firm*—Flehr, Hohbach, Test

[57] ABSTRACT

A subscriber terminal for use in a TDM telephone system operating in a multiframe format where each time frame consists of a plurality of time slots, said system including a base switch connected to a plurality of multitime slot data buses for switching encoded data between specified ones of the time slots. A subscriber switch is connected to a plurality of local subscriber lines and to a pair of the data buses for switching encoded data between the subscriber lines and specified time slots on the pair of data buses. The subscriber switch includes a number of subscriber terminals where each terminal is connected to some of the subscriber lines and includes a pair of subscriber switch controllers for controlling the switching of data between the subscriber lines and the pair of buses. Each subscriber terminal provides the capability of encoding, multiplexing and switching data from a plurality of subscriber lines to specified time slots on the pair of multitime slot buses and capability of decoding, demultiplexing and switching other encoded data from specified time slots on the pair of data buses to the subscriber lines.

12 Claims, 11 Drawing Figures

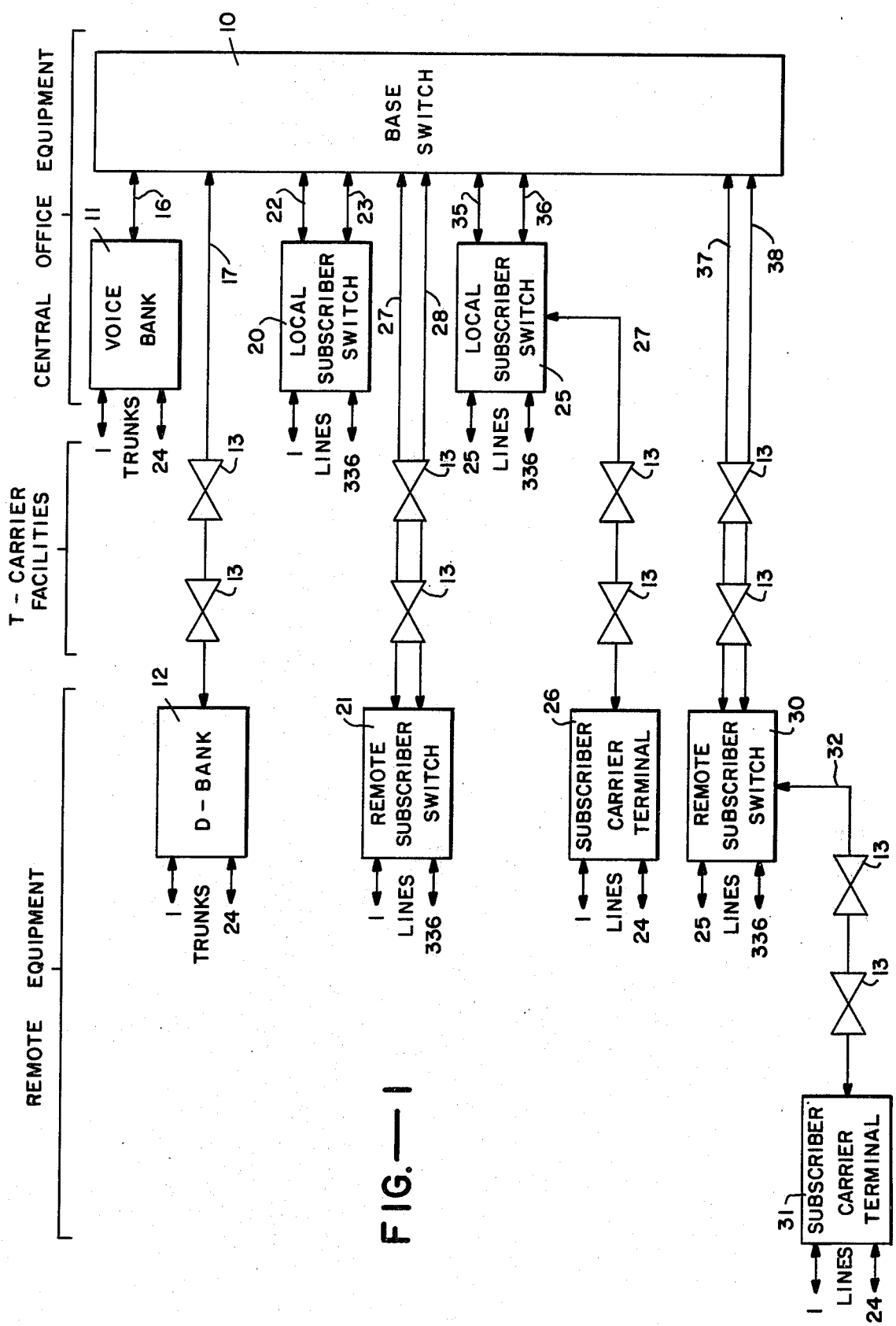
FIG.—1

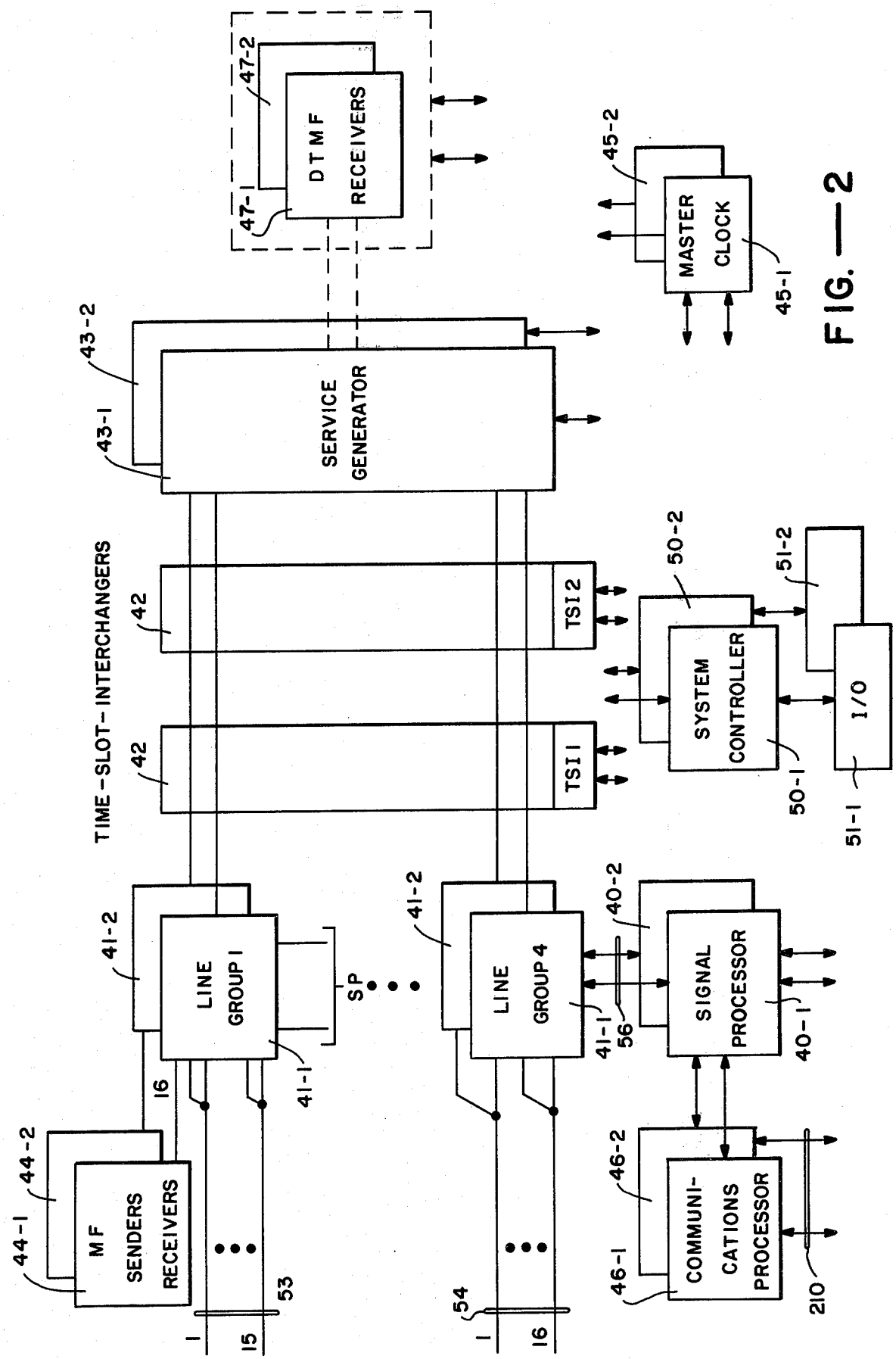
FIG.—2

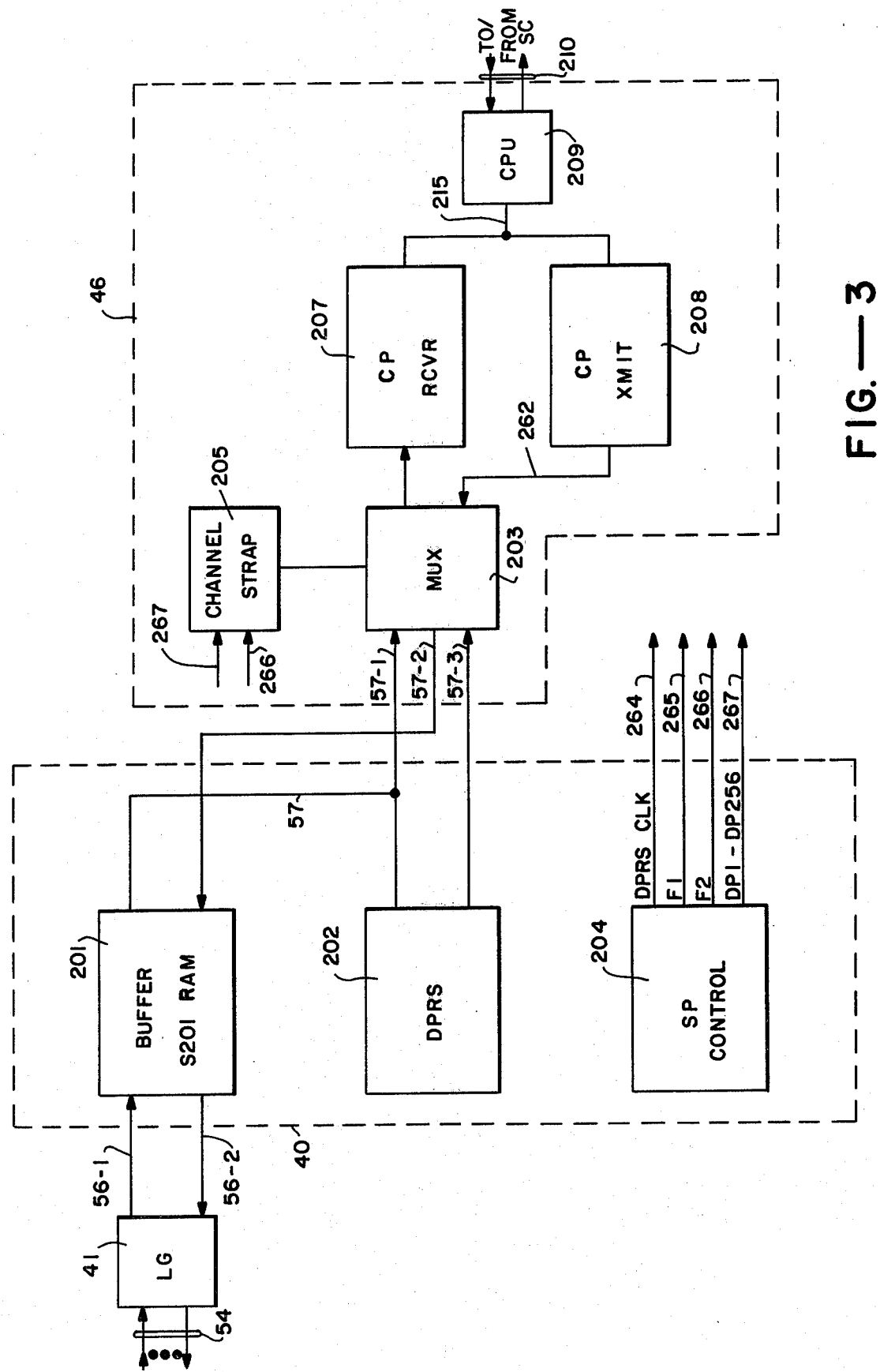
FIG.—3

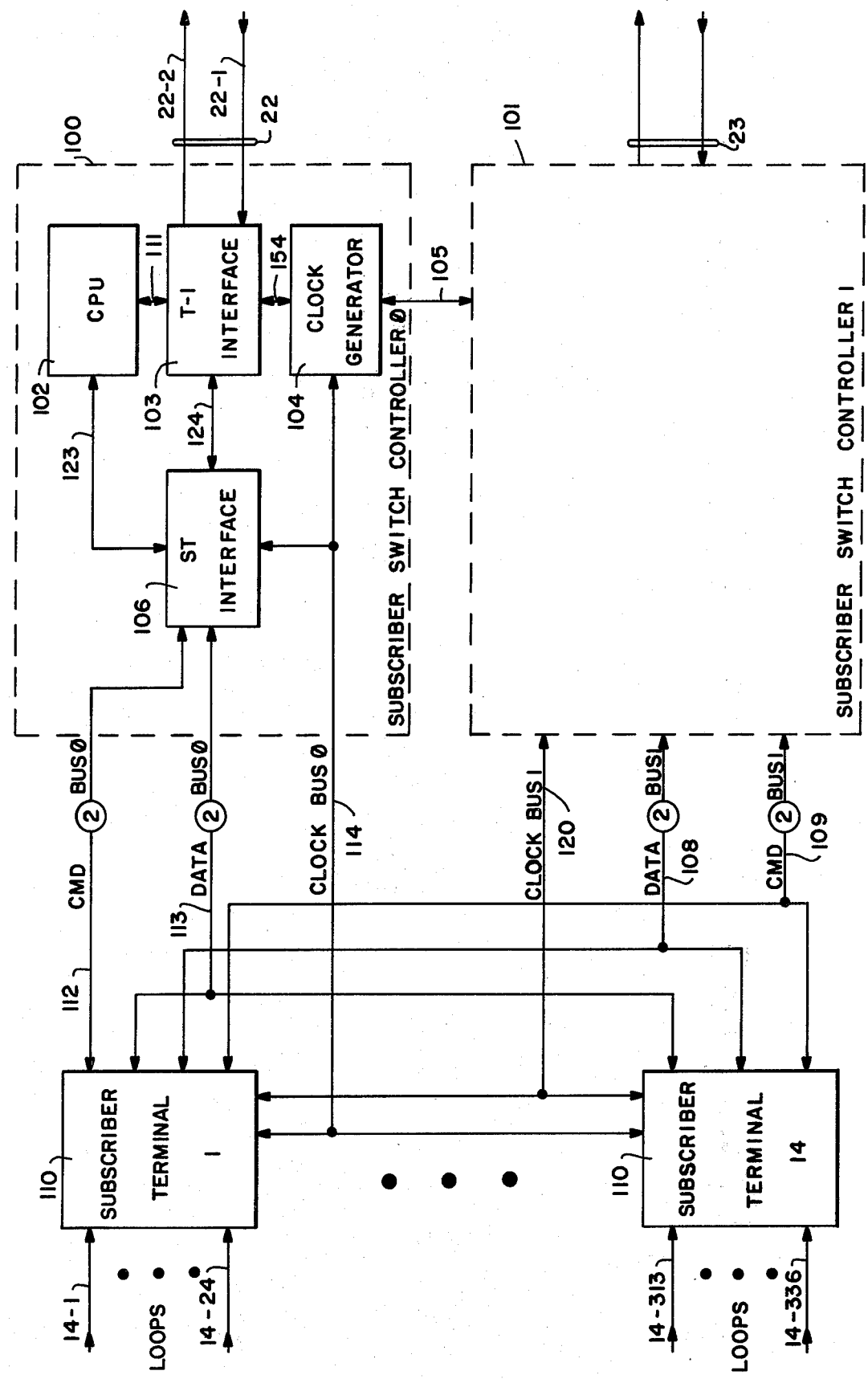
FIG.—4

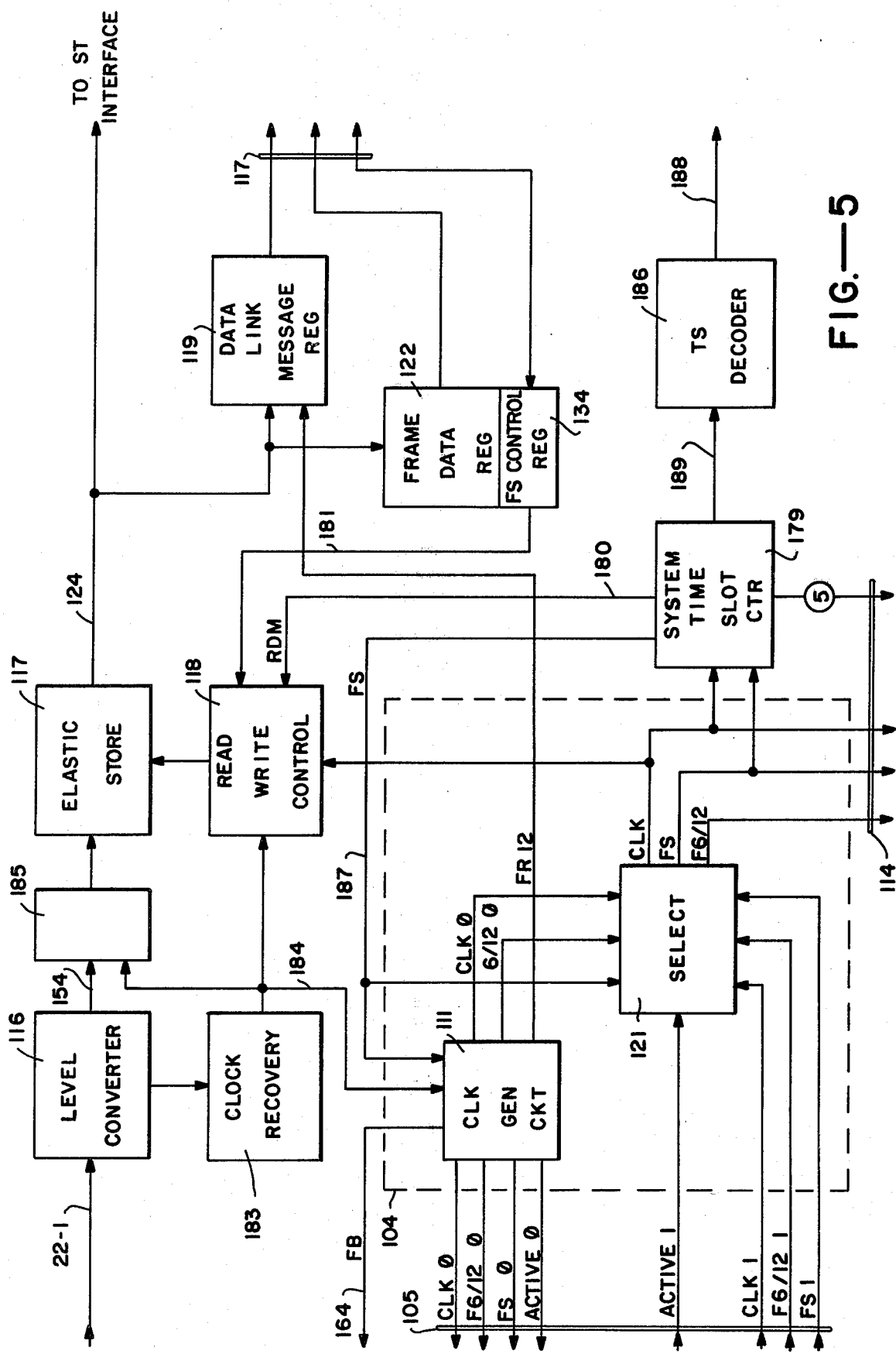
FIG.—5

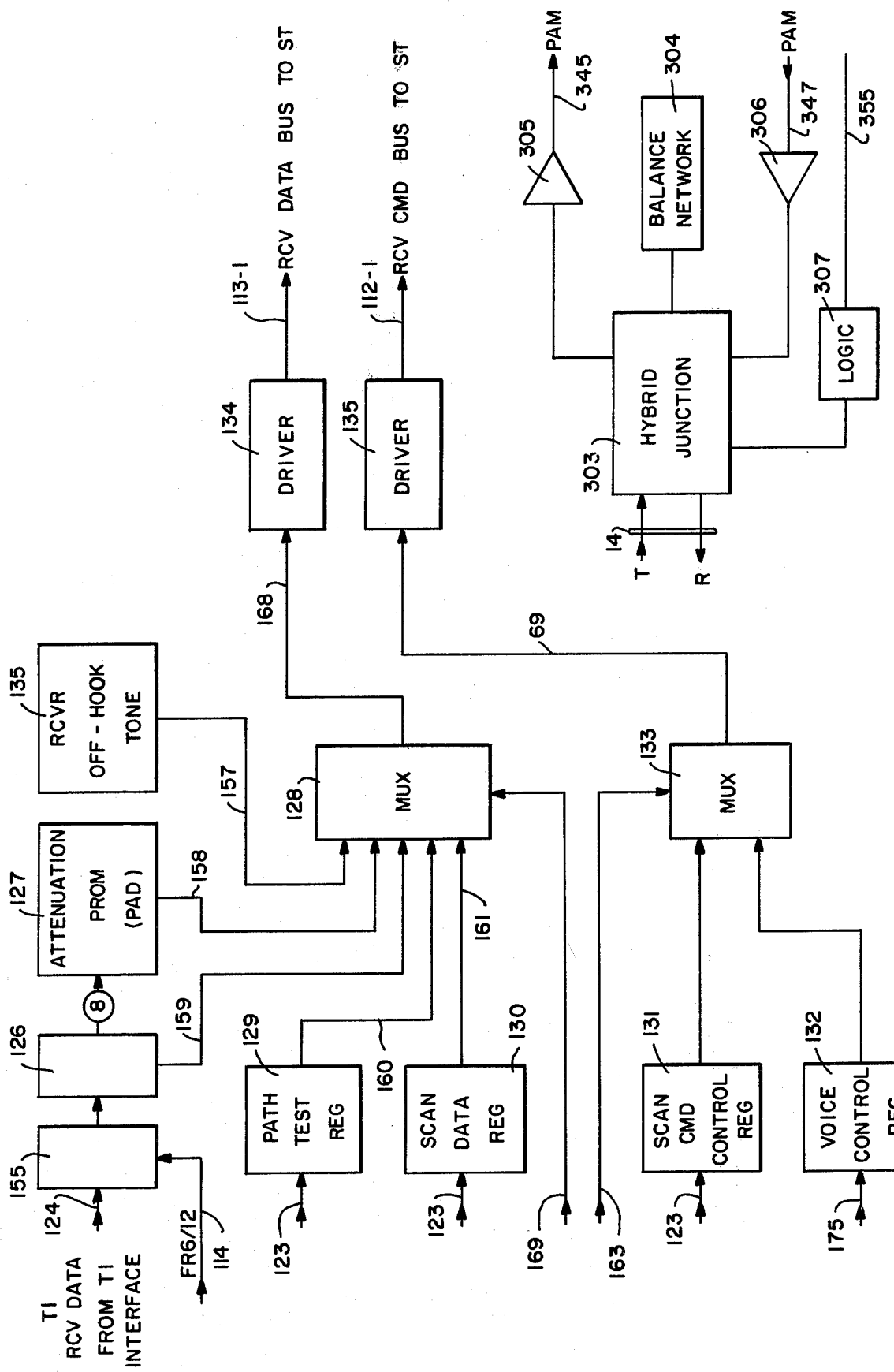

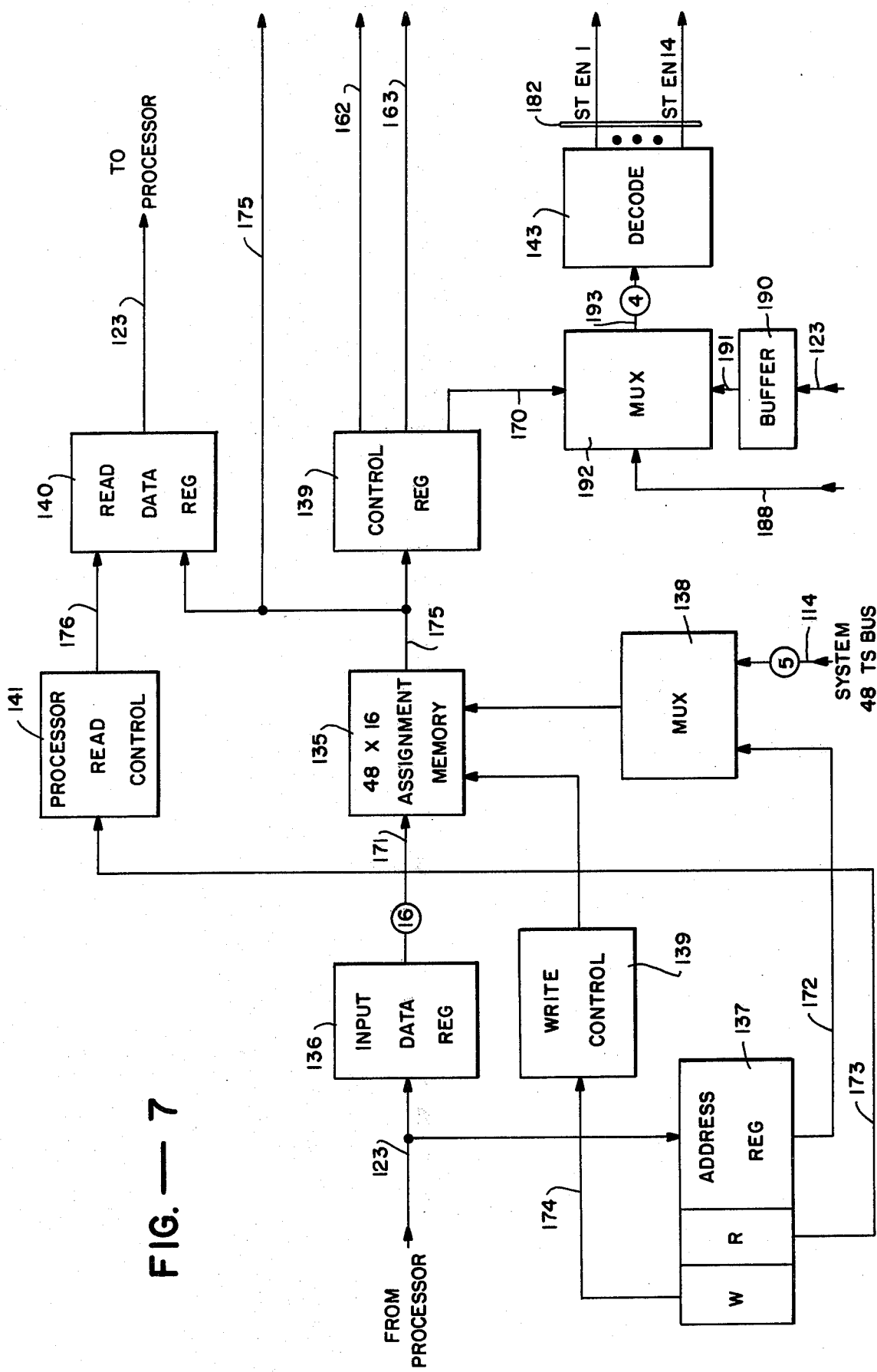

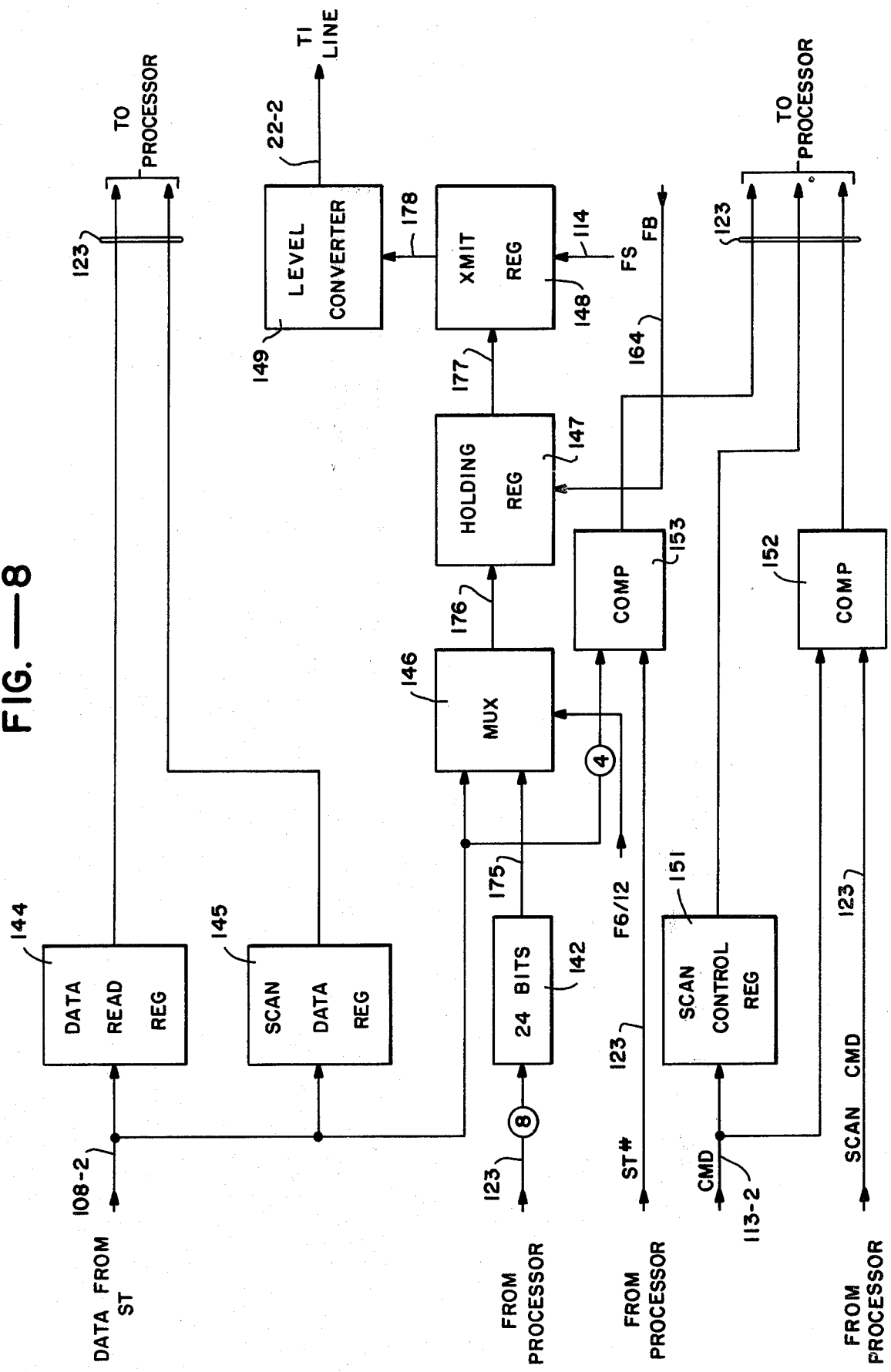

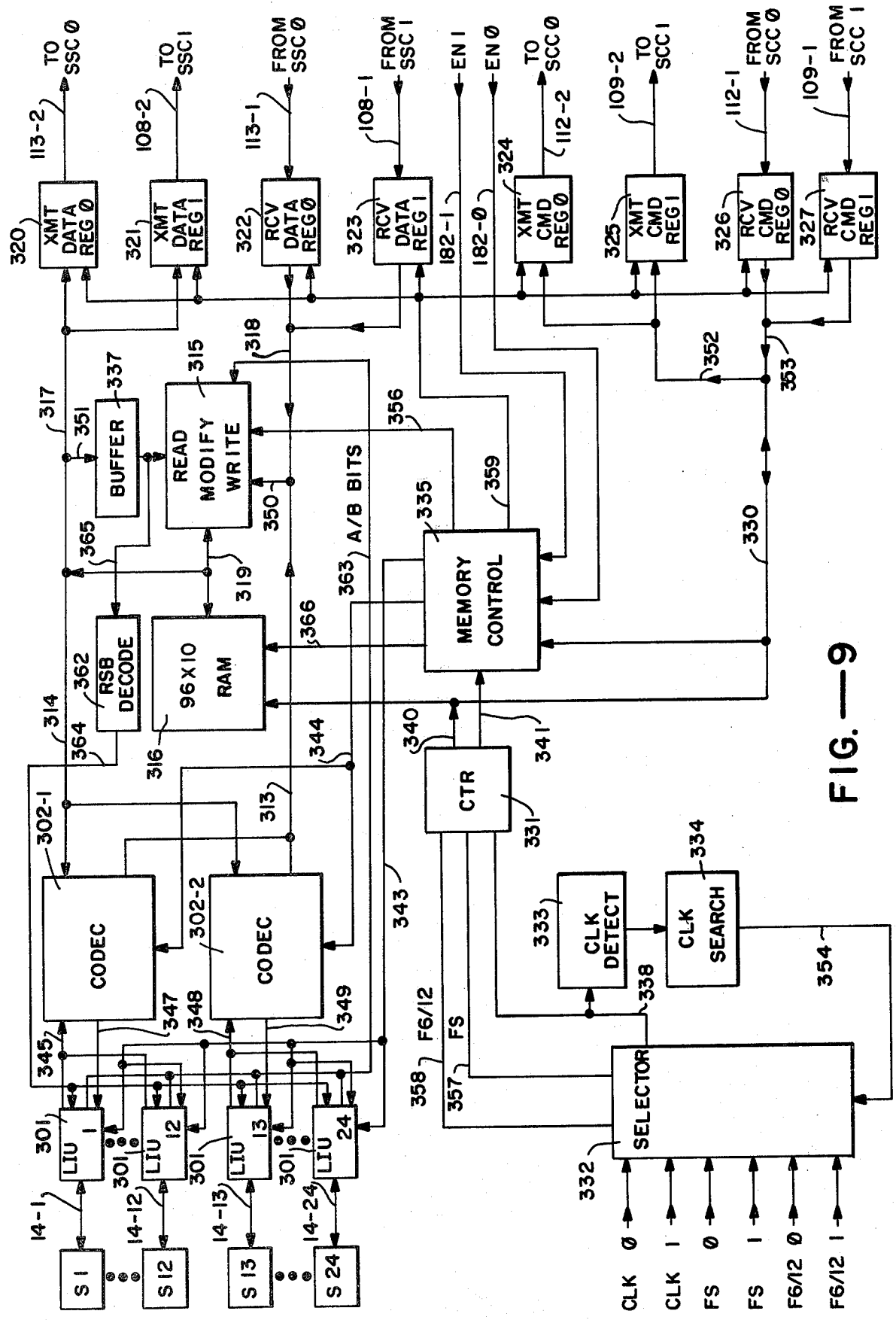

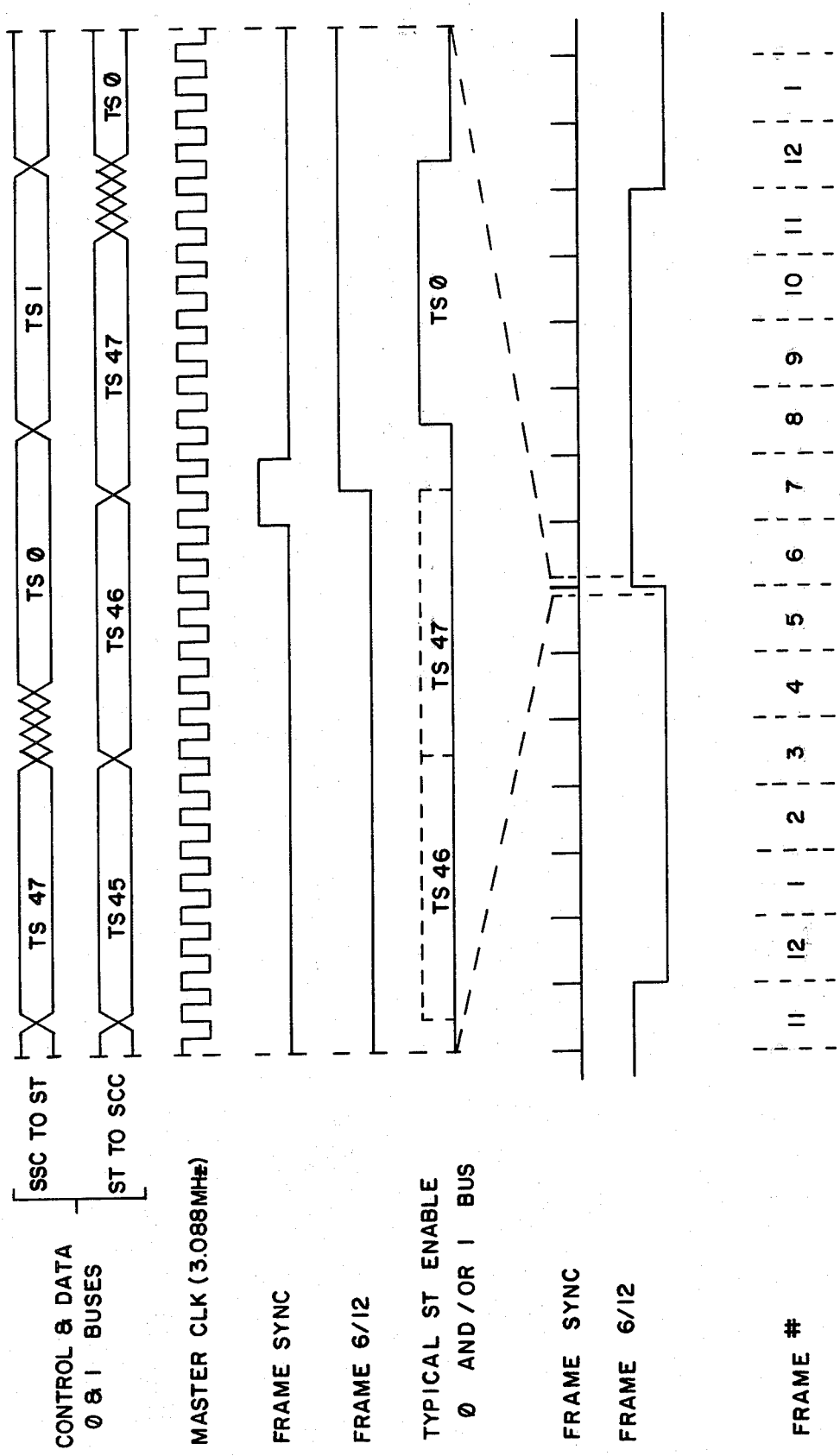
FIG.—11

SUBSCRIBER TERMINAL FOR USE IN A TDM SWITCHING SYSTEM

CROSS REFERENCES TO RELATED APPLICATIONS

1. Integrated Transmission and Switching System, Ser. No. 874,521, filed Feb. 2, 1978, invented by John C. McDonald et al, and assigned to the same assignee as the present invention.

2. Integrated Message Accounting System, Ser. No. 781,348, filed Mar. 25, 1977, invented by John C. McDonald and James R. Baichtal and assigned to the same assignee as the present invention.

3. Dial Pulse Register/Sender For a TDM Switching System, Ser. No. 762,801, filed Jan. 26, 1976, now U.S. Pat. No. 4,133,980, issued Jan. 9, 1979, invented by Johannes A. R. Moed and assigned to the same assignee as the present invention.

4. Communications Processor, Ser. No. 875,495, filed Feb. 6, 1978, invented by John C. McDonald et al and assigned to the same assignee as the present invention.

BACKGROUND OF THE INVENTION

The present invention relates to an integrated telephone transmission and switching system and more particularly to a subscriber terminal for making connections between a plurality of local subscriber lines and a central office local subscriber switch.

Referring to the cross-referenced application entitled "Integrated Transmission and Switching System", there is provided therein a system for making digital connections between local subscriber lines and any other subscriber line in the system. That system includes a central office base switch connected to a plurality of multi-time slot digital data buses, commonly known as T-1 lines, for switching encoded data between any of the time slots, using pulse code modulated (PCM) switching techniques. In order to make connections between a local level and any other subscriber line in the system, a subscriber switch is desirable for connecting a plurality of local subscriber lines to specified time slots on a T-1 line. This enables the base switch to make the interconnections with any other time slot in the system. To achieve such a switching system, there is need for a subscriber terminal capable of interchanging and concentrating a plurality of subscriber lines to specified time slots on T-1 lines.

In view of the above background, it is an objective of the present invention to provide a subscriber terminal for concentrating and connecting a plurality of local subscriber lines to specified time slots on a multitime slot digital data bus, thereby enabling digital connections to the any subscriber line in the system.

SUMMARY OF THE INVENTION

The present invention relates to a subscriber terminal for use in an an integrated telephone transmission and switching system for making connections between a plurality of local subscriber lines and a central office local subscriber switch.

The system operates in a time frame consisting of a plurality of time slots having a base switch connected to a plurality of multitime slot buses for switching encoded data between any of the time slots on the buses.

A subscriber switch is included connected to a plurality of local subscriber lines and to a pair of the multitime slot buses for connecting the subscriber lines to specified time slots on the pair of buses. The subscriber switch includes a number of subscriber terminals, each terminal connected to some of the subscriber lines, and a subscriber switch controller for enabling the connections. Each subscriber terminal includes codec means for encoding and multiplexing data on the subscriber lines into a time frame corresponding to the multiframe format. Memory means are provided having a plurality of channel units each corresponding to the plurality of subscriber lines.

A first write multitime slot data bus is connected between the codec means for carrying encoded data in corresponding time slots. Means for writing are provided for writing the encoded data from the multiplexed subscriber lines into a channel unit corresponding to the subscriber lines. Also included is a first read multitime slot data bus connected to the memory means and to a subscriber switch controller. Means are provided for reading the encoded data from the corresponding channel unit onto a specified time slot on the first read data bus.

A second write data bus is connected between the subscriber switch controller and the means for writing so that the writing means writes other encoded data on a specified time slot on the second write bus into other corresponding channel units. A second multitime slot read bus is provided connected between the memory and the codec means and means are also provided for reading the encoded data from the other channel units to time slots on the second read bus corresponding to the subscriber lines. The codec means includes means for decoding and demultiplexing data on the second read bus for connecting data to the corresponding subscriber lines.

In accordance with the above summary, the present invention achieves the objective of providing a subscriber terminal for concentrating and connecting a plurality of subscriber lines to specified time slots on multitime slot data buses.

Additional objects and features of the invention will appear from the following description in which the preferred embodiments of the invention have been set forth in detail in conjunction with the drawings.

DESCRIPTION OF THE DRAWINGS

FIG. 1 depicts a block diagram of an integrated transmission and switching system in accordance with the present invention.

FIG. 2 depicts a block diagram of a base switch, which forms a portion of FIG. 1.

FIG. 3 depicts a block diagram of a communication processor, which forms a portion of FIG. 2.

FIG. 4 depicts a block diagram of a local subscriber switch, which forms a portion of FIG. 1.

FIG. 5 depicts a block diagram of a T-1 interface, which forms a portion of FIG. 4.

FIG. 6 depicts a block diagram of a portion of a subscriber terminal interface, which forms a portion of FIG. 4.

FIG. 7 depicts a block diagram of another portion of a subscriber terminal interface, which forms a portion of FIG. 4.

FIG. 8 depicts a block diagram of still another portion of a subscriber terminal interface, which forms a portion of FIG. 4.

FIG. 9 depicts a block diagram of a subscriber terminal, which forms a portion of FIG. 4.

FIG. 10 depicts a block diagram of a line interface unit, which forms a portion of FIG. 9.

FIG. 11 depicts a timing diagram for the system of FIG. 4.

DETAILED DESCRIPTION OF THE DRAWINGS

FIG. 1-Block Diagram

Referring to FIG. 1, a block diagram of one embodiment of an integrated digital transmission and switching system (local digital switch) is shown which provides Class 5 central office switching functions. It includes a base switch 10 and one or more subscriber switches such as local subscriber switches 20, 25 and remote subscriber switches 21, 30. The subscriber switches such as switch 20 concentrate and connect a plurality of subscriber lines to the base switch 10. For exmple, local subscriber switch 20 concentrates and connects up to 336 subscriber lines to the base switch via buses 22, 23.

In one approach for a digital telephone switching system, a multiplicity of conversations are multiplexed serially along a two-wire digitally multiplexed line commonly known as a T-1 line, such as buses 22, 23 in FIG. 1. Each T-1 line has 24 pulse code modulated (PCM) time slots operating in a basic time frame of 125 μsec. Each time slot is allocated 8 bits in which sampled data between a calling party and a called party is digitally represented in PCM format. Each frame of 125 μsec includes one frame bit plus 24 time slots of 8 bits each or a total of 193 bits per frame, with the frame rate based upon a sampling rate of 8 KHZ (the reciprocal of 125 μsec). A typical frame structure known in the art includes a multi-frame format of 12 frames of 193 bits each, in which the eighth bit of each time slot in frames 6 and 12 carries a signaling bit. The signaling bits are used by signal processing circuitry to detect supervisory signals such as on hook, off hook and dial pulse.

In FIG. 1, the base switch 10 is connected to a voice bank 11 via T-1 line 16. Voice bank 11 is well-known equipment which interfaces to 24 trunks, which thereby allows for trunk termination directly on the base switch 10. In one embodiment, the base switch 10 interfaces to the world on 64 T-1 lines (a total of 1536 time slots) and can switch non-blocking between any of its time slots. The base switch 10 is described in the cross-referenced application entitled "An Integrated Message Accounting System".

Each of the 24 or 48 channels between a switch such as subscriber switch 20 and the base switch 10 is referred to as a junctor. The subscriber switches may be collocated with the base switch 10 such as switches 20, 25 or located at a remote site such as remote subscriber switches 21, 30. A remote subscriber switch can interconnect the 336 subscriber lines within the switch. The subscriber carrier terminals (SCT) 26, 31 connect 24 subscriber lines to T-1 lines 27, 32, which provides connections to particular subscriber switches. Equipment remotely located is connected to the various switches through repeaters 13. In one embodiment, a local (LSS) or remote (RSS) subscriber switch can handle up to 336 local loops for connection to the 48 time slots on the T-1 lines. Each subscriber switch, whether local or remote, uses two T-1 lines for connection to the base switch 10. Therefore, in a local subscriber line system with 6384 terminations, the RSS and LSS would require 38 of the available 64 base switch 10 ports available. This leaves 26 ports or 624 channels (26×24) for multifrequency senders, receivers and trunks.

Various termination examples for the switching system described herein are as follows:

| Trunks | Service Ports | Subscriber Lines |
|---|---|---|
| 1488 (62 T-1) | 48 (2 T-1) | 0 |
| 1416 (49 T-1) | 72 (3 T-1) | 336 (2 T-1) |
| 1272 (53 T-1) | 72 (3 T-1) | 1344 (8 T-1) |
| 1080 (45 T-1) | 72 (3 T-1) | 2688 (16 T-1) |
| 552 (23 T-1) | 72 (3 T-1) | 6384 (38 T-1) |

Before describing FIGS. 1-14 in further detail, a brief overview discussing the routing of a telephone call will be given. When a subscriber goes off hook, this condition is detected by a subscriber switch such as switch 20 and a message is sent to the base switch 10. The message contains the subscriber line number and state of the subscriber originating the call. The base switch 10 finds an idle junctor to the associated subscriber switch and sends a message to the subscriber switch commanding it to connect the subscriber line to the idle junctor. The subscriber switch will make the connection and perform a path test to determine if a path was set up correctly. The base switch 10 will connect dial tone by sending a message to an internal service generator commanding it to attach dial tone to the associated time slot. Dial tone is removed when the first digit is received. The called number is translated in the base switch by an internal system controller to determine how to route the call. For a local call, the base switch system controller checks if the called party is idle and determines the identity of the called party's particular subscriber switch. Ring back tone is applied to the calling party's line and message is sent to the called party's subscriber switch to command it to ring the appropriate line. When the called party answers, the ringing is stopped, the ring back tone is dropped and a path is established between the two junctors through the base switch. An idle junctor to that subscriber switch is selected and it is commanded to set up a connection between that junctor and the called party. No further action occurs until the call terminates and then the path in the base switch is dropped and messages are sent to the associated subscriber switches to command them to drop their connections and restore the lines to the idle condition.

FIG. 2-BASE SWITCH

Referring to FIG. 2, the base switch 10 is shown and is described in more detail in the cross referenced application entitled "Integrated Message Accounting System". The base switch 10 provides switching functions and interfaces directly to 64 T-1 lines. T-1 interfaces are used to connect either local or remote subscriber switches via T-1 lines such as 22, 23 of FIG. 1. Switching functions are provided to connect calls between subscriber switches, either local or remote, and between subscriber switches and trunks. The base switch 10 incorporates redundancy features for each subsystem (primary and secondary) and for simplicity will generally be described herein for only the primary subsystems.

Briefly, the subsystems within base switch 10 include a signal processor 40, line groups 41, time slot interchanger 42, service generator 43, multi-frequency sender/receiver 44, and master clock 45, all of which are controlled by system controller 50. In addition, a communication processor 46 is connected with the signal processor 40 and to the system controller 50 to provide a communications link between subscriber switches and the base switch. The communications link is over associated T-1 lines between the subscriber switch and the base switch, such as lines 22, 23 of FIG. 1, which form a part of buses 53 or 54 of FIG. 2.

With a sampling frequency of 8,000 Hz for encoding PCM data, one timing frame equals 125 microseconds with 24 time slots per frame per T-1 line. Each channel of information is in the form of 8 bit channel words. A framing bit is added every 24 channels to form and define a frame. Each frame of 125 microseconds equals one frame bit plus the 24 time slots of 8 bits each and therefore there are 193 bits per frame.

In a multiframe format of twelve frames, the frame bit occurs once at the start of each frame, with a framing code that takes 12 frames to repeat.

In each time slot there is an 8 bit speech code to digitally represent a quantized value of a particular portion of an analog signal. Once each six frames the eighth bit of each time slot carries a signaling bit to indicate on-hook or off-hook status of that particular channel or time slot.

In PCM systems like that of FIG. 2, quantizing a message signal by certain discrete levels or steps inherently introduces an initial error in the amplitude of the samples, giving rise to quantization noise. Quantization noise can be reduced by the use of nonuniform spacing of levels, to provide smaller steps for weaker signals and coarser quantization near the peak of large signals. The $\mu$-255 companding law utilizes this concept of encoding PCM data in which the coding magnitude range is divided into 8 segments, and 16 levels are equally spaced within each of the 8 segments. From one segment to the next higher, the level spacing (step size) increases by a factor of 2. In the 8 bit code word representing any sample, the first bit gives the sign, the next 3 bits describe which of the 8 segments contain the sample, and the last 4 bits specify the nearest of the 16 possible levels within the segment.

In FIG. 2, data on T-1 lines 53 are applied to both the primary and secondary line groups 41. For example, data is input to primary line group 41-1 and secondary line group 41-2.

As seen in FIG. 2, primary and secondary interface redundancy is employed in all major subsystems to prevent a single point failure which could cause the system to go down. Faulty subsystems are automatically switched off line to provide minimum interruption to service.

A line group 41 interfaces any T-1 line pairs 53 with time slot interchangers (TSI) 42, designated TSI 1-2. A line group 41 also interfaces multifrequency sender (MFS) and receiver (MFR) 44 with the TSI 42. A group such as line group 41 accepts bipolar PCM data from a T-1 line, which is converted by the line group to 9-bit parallel (includes parity bit) and sent to the time slot interchanger (TSI) 42. Error signals and signal bits are sent to the signal processor (SP) 40 for further analysis.

It is possible to operate 16 T-1 interfaces for each primary and secondary subsystem per line group. Each interface accomodates one T-1 line and up to four line groups per base switch may be used.

A line group organizes the data from 16 T-1 lines or 15 T-1 lines and the MFS onto a 384 time slot data bus 58 to the TSI's 42.

Referring to FIG. 2, the TSI 42 switch channel time slot data (8 bits plus parity) from any of the four line groups to any other channel time slot of any other of the four line groups. For example, data from line group 1 could be sent to TSI and switched out to line group 4. When it is available from a line group data bus, the TSI's hold it until the proper time for output in the next frame and transmit the data to the line group data bus such as bus 59 for output. The TSI 42 contains control and data memory for all time slots and communicate with both the primary and secondary system controllers (SC) 50-1, 50-2.

In FIG. 2, the service generator (SG) 43 provides capability to connect one of several standard tones in PCM format to any of the channel time slots. These tones include 1,000 Hz, 120 IPM busy, 60 IPM busy, dial tone, ring back tone and internal tones for the system. The SG 43 receives control signals from the respective system controller (SC 50).

The signal processor (SP) 40 monitors all the input channels for changes of state and dialed digits. Each time a channel is seized or released, or a digit is dialed, a message is sent to the respective SC 50 containing the channel number and the event. All the information needed to determine the changes of state or dial digits is time division multiplexed over several leads originating from the line group on bus 56.

The SP 40 also has the capability to seize or release channels or dial digits on these channels. Frames 6 and 12 are signaling frames. During these frames, the least significant bit of the 8 bit PCM byte is replaced with a signaling bit. Frame 6 is used for an "A" signaling bit and frame 11 is used for a "B" signaling bit. The signal processor uses the A signaling bit for seizure, release and dial digit detection. The B signaling bit is used for state change detection only.

The signal processor 40 receives and transmits "A" and "B" bits from and to the line groups 41 for on/off hooks and digits. The communication processor 46 performs the control and communication functions for the signal processor.

In one embodiment, the "B" signaling bits, which occur every twelve frames in a multi-frame format, are used to formulate a 24-bit message. All signaling bits are extracted from the T-1 lines by the line groups 41 and routed to the signal processor 40, which will process the signaling bits and route the messages to the system controller 50.

The communication processor 46 also performs the functions of "B" bit receivers and transmitters, interfacing and control, and channel selecting. The communication processor 46 receives and transmits the "B" bits that form the messages to and from the subscriber switches. "B" bits from all of the 64 T-1 ports are received and stored by processor 46. When a message is to be transmitted from the base switch 10 to a subscriber switch, the 24 bits are transferred to the processor 46 which then transmits them to the appropriate line group 41 at the correct time, as will be described.

In one embodiment, a message consists of four bytes of data where the first byte is a control byte and the last three bytes form the message to be sent or received. The CP 46 also scans its internal receivers to check if any messages have been received. If there is a message, it will be sent to the system controller 50. Messages received from the system controller are tranferred to the appropriate line group.

In FIG. 2, the Master Clock 45 is a conventional device for generating all basic clock signals used by the base switch.

Should a single point failure occur somewhere in the primary system, the primary system controller 50-1 will de-activate the on-line system by de-activating an "Active" signal. The off-line system will go on-line by the secondary system controller 50-2 activating the secondary master clock 45-2, thereby switching the secondary (redundant) system on-line to process data.

The MF senders (MFS) 44 generate and output MF tone pairs onto a line group data bus 58 for switching through the time slot interchangers 42 to an outgoing path such as bus 59 and communicate directly with system controllers 50. The MF receivers (MFR) detects MF tones in PCM digital input form on bus 58 and send them to the SC 50.

The MFS and MFR jointly share one group of 24 time slots and associated control facilites. A minimum of 8 time slots and a maximum of 16 time slots for each sender and each receiver are available to traffic at any time subject to a total maximum of 24 time slots. Systems with more than one line group may be equipped with the above capacity per line group as required by traffic.

The dual tone multifrequency receivers (DTMF) 47 are connected to the service generator for detecting dual tone multifrequency tone at a local level and operate in a manner similar to the MFR 44.

The primary and secondary system controllers (SC) 50 are typically INTEL 8080A stored program microprocessors surrounded by a number of peripheral I/0 devices 51 and interfaced to each subsystem.

The System Controllers 50 provide the following functions:

(1) call processing including routing, ANI (Automatic Number Identification), ONI, recorded announcement control and creation of billing records;

(2) SC self test; and (3) system test and maintenance data outputs for accumulation of traffic monitoring data and generation of traffic monitoring reports. The secondary (redundant) SC 50-2 is updated continuously so that it can assume control of the system with a minimum disruption to service should primary SC 50 experience a failure.

To enable the secondary system controller to come on line and start processing calls should the primary system controller experience a failure, portions of the memory containing the states of all calls in progress are periodically copied into the memory of the secondary system controller through direct memory access techniques which are well known in the art.

Each system controller is equipped with 64K bits of memory addressable by a 16-bit address bus. Further details of the operation of the Intel 8080A microprocessor are described in the Intel 8080A System User's Manual.

FIG. 3 COMMUNICATIONS PROCESSOR

Referring to FIG. 3, a block diagram of the communication processor 46 is shown. For simplicity, the communication processor 46 is shown connected to one line group, but it is to be understood that processor 46 is also connected to the other line groups in the systems. Data is input on T-1 lines 54 to line group 41 and the A & B signaling bits are gated out on bus 56-1 at the appropriate time into a buffer 201 (S201 RAM) which forms a part of the signal processor 40, the details of which are described in more detail in the cross-referenced application entitled "Register/Sender". The A & B signaling bits are then gated on bus 57 into the dial pulse register sender (DPRS) 202 of the signal processor 40, or into a multiplexer 203 (LS157). Timing signals provided from the signal processor control circuit 204, as seen in FIG. 6, are the DPRS CLK, F1, F2 on buses 264-66. The DP1-DP256 signals on bus 267 provide addressing for up to 386 time slots. The F1 and F2 signals identify frames 1-5, 6, 7-11, and 12, and DPRS CLK provides appropriate clocking during those periods.

The channel selector 205 includes a conventional selector (74150) connected to each line group for identifying which T-1 lines are connected to a subscriber switch. In one embodiment, there are four selectors, one each for the four line groups. The selectors are addressed by the DP1 DP8 signals on bus 267 from the SP control 204. Selector 205 identifies which of the T-1 lines are connected to the subscriber switches, and when ANDed with the F2 signal, will inform the communication processor 46 at which time transmitting and receiving signals to and from a particular subscriber switch can be effected.

The communication processor 46 also includes a CP receiver 207, CP transmitter 208, and central processing unit (CPU) 209, which typically is an Intel 8080A microprocessor and storage circuitry.

The communication processor 46 communicates with the base switch system controller 50 of FIG. 2 via buses 210. In order to manipulate the B signaling bit for data communications between the base switch 10 and a subscriber switch the B signaling bits are input from line group 41 into buffer 201 for connecting the signaling bits to either the DPRS 202 or the communication processor 40. If the communication processor 40 is waiting for data from the line group, the selector 203 will connect the B signaling bit into the communication processor. The message is shifted via bus 260 into the CP receiver 207 and connected to the CPU 209 for transmission to the base switch system controller 50. In order to transmit data from the processor 40 to a particular line group, data is loaded from the system controller to the CPU 209, loaded into the CP transmitter 208 and gated out through MUX 203 into buffer 201 and to the line group 41 at the appropriate time.

Further details of the communication processor are described in the cross-referenced application entitled Communication Processor.

FIG. 4 - LOCAL SUBSCRIBER SWITCH

Referring now to FIG. 4, a block diagram of a local subscriber switch 20 of FIG. 1 is shown. The local subscriber switch includes subscriber switch controller (SSC) 100 and 101, where each SSC is identical in configuration and therefore for simplicity only SSC 100 will be described. Each SSC is connected to a T-1 line such as line 22 or 23, which correspond to those shown in FIG. 1. The SSC's independently scan each subscriber terminal (ST) for line seizures, transmit and receive messages to and from the base switch 10, interface the connecting T-1 lines 22, 23 and connect/disconnect lines to the base switch.

Each SSC includes a central processing unit (CPU) 102, T-1 interface 103, clock generator 104 (each of which are cross latched to the alternate SSC by bus 105). Also included in an SSC is an ST interface 106, which interconnects to each of the subscriber terminals 10, each of which in turn connects to up to 24 subscriber lines. In one embodiment, the subscriber terminals 10 concentrate a total of 336 subscriber lines to any time slot on either of T-1 lines 22, 23. Other variations, of course, are possible. For example, a system could be utilized in which 16 subscriber terminals concentrate 384 subscriber lines to the two T-1 lines 22, 23.

The buses connecting each subscriber terminal 10 to an ST interface 106 are as follows. Each subscriber terminal 10 connects to command buses 112, which are two serial data buses, RCV command bus 112-1 and XMT command bus 112-2. The RCV command bus carries command signals from an SSC to an ST and the XMT command bus returns command signals to an SSC. Similarly, data buses 113 are two serial buses similar to that of the command buses--a RCV data bus 113-1 and XMT data bus 113-2. The command and data buses are 48 time slot buses, the format of which will be described below.

These buses are redundant, one set of four for each SSC. They are independent and the failure of one will not affect the other.

The data rate is 3.088 Mhz for each of the four buses and there are 48 time-slots with 8 bits of data per time-slot.

In one embodiment, alternate time-slots are used for calls going to the base switch 10. The SSC's are able to extract data from the alternative time-slots and output it on the T-1 lines 22 or 23 without having to buffer a frame's worth of data. Two of the remaining time slots are used for communications between the SSC's 100, 101 and the ST's 10. The remaining time slots are utilized for interconnecting the local subscriber lines in a remote subscriber switch such as RSS 21 of FIG. 1. Even time-slots (0, 2, . . . 46) are used for the channels to the base switch and the odd time-slots 23 and 47 used for the control channels. The remaining odd time-slots (1, 3, . . . 21, 25 . . . 45) are used in a remote subscriber switch.

Individual select lines are used to enable a specific ST. The data and command buses such as 113, 112 are common to all ST's. The select lines designate which ST will receive and transmit on the data and command buses at any given time slot.

A clock generator 104 is associated with each SSC. They derive their timing independently from their associated T-1 line. Only one clock generator is used at any one time to drive both SSC's and all the ST's. This means the subscriber switch is run synchronously. If a failure is detected in one clock, it will be taken out of service and the other one will be activated.

A 3.088 Mhz clock, a frame sync (FS) pulse, and signaling frame (F6/12) pulses are included in the clock buses 114 from each SSC.

The subscriber switch control functions are performed by the SSC's. Under the command of the base switch 10, a microprocessor in each SSC directs all the functions related to the associated T-1 line 22 or 23. Each SSC 100, 101 has access to all the subscriber terminals (ST) 10 via its own data and control buses. It interfaces to its associated T-1 line 22, 23 and extracts timing from it for clock generation.

An SSC 100, 101 scans the ST's 10 for subscriber loop status and for the ST status (errors or alarms). If any changes are detected, a message is formulated and transmitted to the base switch (BS) 10. The BS 10 will respond with messages such as to set up or drop paths and apply ringing.

As previously described, the communication link to the base switch is over the associated T-1 line. The "B" signaling bits of the T-1 line are used to formulate a 24 bit message, which gives a 16 KB/S channel. The data rate will not be this high since when the SSC transmits a message, it will wait for a response before it sends another message.

The major functions the basic SSC is to perform are: T-1 interface, communication link, ST control, clock generation, and attenuation pad.

The T-1 interface 103 converts the bipolar PCM data from the receive line 22-1 to TTL signals. A clock recovery circuit extracts clocks for clocking the data and for the clock generation circuit. For each eight bits of data, a parity bit is generated and is inserted into the associated control byte. The data bits are put on the RCV data bus 113-1 along with the associated control byte on the RCV CMD bus 112-1 at the even time slots.

If the time-slot is marked to require an attenuation pad, the eight data bits received from the T-1 line 22-1 are used to select from a PROM an output which is down in amplitude by the correct number of DB's. Thus, a digital attenuation pad can be inserted in the data stream of any channel from the base switch 10. When the base switch 10 determines that a pad is necessary, it will issue a command to the SCC 100 or 101, instructing it to insert a pad of the correct value. The T-1 interface 103 then substitutes the output of a PROM for the data as it passes through.

The SSC also functions to put data on the control bus and to scan the status of each terminal. There is a 48 word by 16 bit memory where each word is associated with one of the time-slots. The bits are partitioned as follows:

4 bits: ST address
5 bits: terminal channel address
3 bits: pad
1 bit: assigned flag
1 bit: path test
1 bit: reading
1 bit: parity To assign a time-slot, the SSC loads the location for that time-slot with the proper address and sets the assigned bit. Prior to the beginning of each time-slot, the memory is read and the ST address is decoded to enable the specified ST. The ST channel address and the data parity bit are loaded into a buffer to be shifted out onto the RCV CMD bus.

Scanning of the channels could be achieved by either software or hardware control. Under software control, the processor loads a two byte command and then the command is shifted out to the appropriate subscriber terminal in the next control time slot (23 or 47).

In a hardware approach, the SSC scans one channel at a time where the scanning sequence is to scan the same channel in all 14 ST's and then advance to the next ST channel. The two SSC's scan in opposite directions; one by increasing addresses and the other by decreasing addresses.

A nine bit counter generates the scan address and during the control time-slots, four bits of the scan address are decoded to enable one ST while the other five bits become the channel address that is shifted out onto the control bus. The scan command is shifted out with the channel address. This scanning is an automatic hard-wired process that can be superseded by the processor when it loads a command register. This command register will be put onto the control bus in place of the normal scan command.

The processor 102 will be interrupted when the scan result is received. The processor 102 is always interrupted if it initiated the command. When a command is sent out, the ST returns data over the data and command lines 112, 113. The commands are reflected or regenerated by the ST so that the processor 102 can check what the ST received.

The system clocks are generated from a voltage controlled oscillator clock generator 104 whose output is divided down and phase compared with the clock signal derived from the associated T-1 line which has also been divided down. The result of the comparison is used to modify the oscillator's frequency such that the average frequency of the two is the same. This base frequency is used to generate the system clock (3.088 Mhz), the frame sync (FS) and the signaling frame (F6/12) pulses.

The clock generator will also check the synchronization of a T-1 line 22. In general, three or more frame bits are missed in seven frames, a reframe routine will be invoked. The reframe routine is implemented in the processor program.

Error checking circuits monitor the absence of the clock derived from the T-1 line and monitor the frame sync and signaling frame pulses. When errors are made, the failed clock is taken out of service. The clock enable signals from the two SSC's are cross-latched such that only one clock generator is active at any one time.

The subscriber terminal 10 is a 24 channel terminal with a common codec.

The ST contains a memory that is organized with four 10-bit words per channel. The words are identified as follows: (1) receive data, (2) transmit data, (3) receive status, and (4) transmit status.

The memory functions so that any channel or subscriber loop can be connected to any of the 48 timeslots.

The receive status word contains bits for path test enable and for the signaling states to be transferred to the LIU's. There are three signalling bits to give eight states that can be sent to each line.

The transmit status word contains the "A" and "B" bits to be transmitted to the SSC 100 or 101 and the base switch 10. There is a bit designated for the transmit status which is set when the SSC first reads an off-hook. This flags that channel so that the other SSC will ignore the seizure. This status bit may also be set by one SSC if it wants the other SSC to ignore any activity on a particular channel.

A path test consists of echoing the data sent to the ST. When a path test is to be performed, the SSC will set the path enable bit in the ST. This will cause the ST 10 to put any data received on bus 113-1 back out on the transmit data bus 113-2. The SSC 100 sends a specific bit pattern and checks if that same pattern is returned.

Another method of performing a path test is to open the loop on the line side of the ST and then send data towards the ST. The data is converted to analog, reflected by the ST and converted back to digital and sent towards the SSC. This checks everything except the loop.

FIGS. 5 - 8 SUBSCRIBER SWITCH CONTROLLER

Referring to FIG. 5, the data on T-1 line 22-1 from base switch 10 is input to a level converter 116 where it is converted to normal TTL levels and connected via bus 154 to elastic store 117, which is a 256 bit RAM, into which data is written and read under control of read-write control circuit 118, which includes conventional 9-bit counters (LS 393) and selectors (LS 137) for addressing the appropriate location in store 117.

The data from store 117 is output on bus 124 to the ST interface 106 of FIG. 7 for connection to the subscriber terminals. If data is in the form of a message from the communication processor in the base switch, it is stored in the data link message register 119 where it is connected on bus 111 to the central processing unit (CPU) 102 of FIG. 7.

Data from converter 116 is also input into clock circuit 104 via clock recovery circuit 183 and bus 184 where through conventional recovery techniques the typical clocking signals, F6/12 (frame 6 and 12), an active signal, and an ST clock (3.088 Mhz) signal are generated. The clock generator 104 also generates the system time slot address signals (TS1-48) in counter circuit 179, which also generates the FS (frame synchronization) on bus 187. The clock circuit also generates the framing bit signal on bus 164 for connection to the base switch. The clocking signals are shown in FIG. 11.

The corresponding clock signals from the alternate SSC are cross latched in select circuit 121 which allow for selection in selector 121 of only one clock signal. The clock signal is a 3.088 Mhz signal which enables the read write control circuit 118 to write data into elastic store 117. The counter circuit 179 also generates the RDM signal on bus 180 to enable the control circuit 118 to read data out of store 117.

The data from store 117 is also input with the F6/12 signal to a frame data register 122, which is controlled by a processor algorithm to enable the system to detect the signaling bit for each frame in a multiframe format. Eight bits at a time are loaded into register 122, which are examined by the processor algorithm to search for the proper framing code, as previously described. If a framing error is detected, the processor will instruct the control register 123 to either stop or advance via bus 181 the reading counter in control circuit 118 so as to "search" for the proper framing code. The control register 123 thus appropriately stops or advances the count in the read address counter within control 118 as instructed by the processor.

A command time slot decoder 186 receives from counter 179 via bus 189 control signals to generate the time slot 23 and 47 control signals on bus 188, which as previously described are the control time slots.

Referring to FIG. 6, the data from the T1 interface is input on bus 124 to signaling bit supressor 155 and to register 126, where that data either addresses an attenuation PROM 127 or is input to multiplexer 128. The signaling bits on bus 114 are suppressed in suppressor 155 during the signaling frames.

The attenuation PROM 127 is addressable by the 8 bit data from register 126 and is utilized for providing necessary attenuation in decibels (e.g., −2, 4, 6 DB's), when the system processor decides that attenuation is necessary. In one embodiment, there are 8 possible attenuation states which are appropriately selected by the system.

The path test register 129 stores data from the processor on bus 123 for performing a testing function for a subscriber path.

The scan data register 130 and scan command register 131 are utilized for scanning the status of the subscriber terminals. Each SSC performs a sequential scanning of particular channels in the subscriber terminals by utilizing two of the forty-eight time slots (voice control time slots 23 and 47). In one embodiment, one SSC scans from increasing addresses and the alternate SSC scans in decreasing address locations. Voice control register 132 receives the voice control data on bus 175, the format of which will be described in conjunction with the description of the subscriber terminal of FIG. 12.

Multiplexers 128, 133 multiplex the appropriate input signals onto buses 168, 169 for connection to drivers 134, 135, respectively, for connection to the receive data bus 113-1 and the receive command bus 112-1.

A receiver off-hook tone is stored in PROM 135 for synthesizing a receiver off-hook tone, which when appropriately enabled will be transmitted by the SSC to a receive data bus 113-1 to a designated subscriber terminal for instances when a particular subscriber has gone off-hook for a certain period of time.

The control of multiplexers 128, 133 is from the assignment memory on buses 167, 163, which is shown in more detail in FIG. 10.

Referring to FIG. 7, the assignment memory includes a 48X16 bit RAM 135 which stores the necessary data to enable functioning by the SSC. As there are 48 time slots on the buses to the subscriber terminals, the 48 addresses correspond to each time slot and store 16 bits. The first five bits identify which of the 24 subscriber lines in a subscriber terminal are to be identified, the next four bits identify the particular subscriber terminal (one of fourteen), three bits are used for attenuation (PAD), one bit for an assignment flag (this identifies that a time slot is assigned), one bit for path test, one bit for reading, and one bit for parity. The 16 bits are output cyclically from the processor on bus 123 to the input data register 136, where they are written into memory 135 via bus 171 at the location specified through address register 137, which is used for addressing memory 135 via bus 172, through multiplexer 138, at the specified location in the assignment memory 135. Writing of the data into memory 135 is through typical write control circuit 139, which is enabled by a write bit from address register 137. The reading of assignment memory 135 is normally through system time slot addresses on bus 114, which is generated from the clock generator 104 from FIG. 8.

Data from the memory 135 is read via bus 175 at the appropriate time into control register 139 and into read data register data 140 under control of processor read control 141. The bus 175 also connects to the voice control register 132 of FIG. 9.

Also, four bits on bus 170 for enabling a particular subscriber terminal are input from register 139 to decoder 143, which will then enable the designated subscriber terminal via bus 182. Multiplexor 192 receives data from register 139 via bus 170, the control time slot signals 23 and 47 on bus 188, and the appropriate subscriber terminal number on bus 191 from buffer 190, which was loaded by the processor.

Referring now to FIG. 8, data on bus 108-2 from a subscriber terminal is input to one of two registers 144, 145 which are the data read register 144 and scan data register 145. The scan data register 145 is receiving scanning information from a subscriber terminal only during control time slots 24 and 47. The data read register 144 is receiving data for connection to the processor during any other of the time slots. Data from a subscriber terminal is also put to multiplexer 146 for connection to holding register 147 and transmit register 148, from which the data is converted in level converter 149 for connection to output T-1 line 22-2 for transmission to the base switch 10. Holding register 147 also receives the framing bit signal on bus 164 from FIG. 8. During frame 6, the signaling bit is suppressed for all unassigned time slots in MUX 146 under control of the F6/12 signal, which identifies the signaling frames. During frame 12, if a message is to be sent to the base switch, it is input through multiplexer 146 from message register 142, which has been loaded with a message from the SSC processor.

XMT command data from a subscriber terminal is input on command bus 112-2 into scan command register 151 for connection to the processor. Also, error comparison for a scan command is checked with the data from the ST in comparator 52. The last four bits of data from the ST identifying a subscriber terminal is compared with stored ST data from the processor in comparator 153 for error checking.

FIG. 9 - SUBSCRIBER TERMINAL

A functional description for a subscriber terminal is as follows. Each ST must communicate with two SSC's (SSC $\phi$ and SSC 1). Two types of information are passed between the SSC and ST on four serial buses defined as follows:

RCV DATA: Control and voice data from SSC to ST

RCV COMMAND: Command information from SSC to ST

XMT DATA: Control and voice data from ST to SSC

XMT COMMAND: Command echo from ST to SSC

RCV information leads XMT information by two time slots to allow timing for processing. If a particular ST is to process information, the enable line to that ST must be made active between the appropriate RCV and XMT time slot.

A 3 Mhz clock, frame sync pulse, and signaling frame pulse are passed to each ST from each SSC. Information is clocked from the buses to the ST on negative transitions of the 3 MHz clock, while information is clocked to the buses on positive transitions.

In FIG. 11, the frame sync pulse occurs between the end of time slot 47 and the beginning of time slot $\phi$ on the XMT bus. It is used to set internal counters to the correct state with respect to the buses. The signaling frame pulse is used to insert signal bits in XMT data during frames 6 and 12.

The format for the data and command buses are as follows.

TABLE I

| STATES | RCV COMMAND MSB | (SSC TO ST) LSB | RCV DATA |
|---|---|---|---|
| 0. Scan Alarms | $\phi$ $\phi$ $\phi$ $\phi$ $\phi$ $\phi$ $\phi$ | | X X X X X X R |

TABLE I-continued

| | | | | | | | | | | | | | | | | | |
|---|---|---|---|---|---|---|---|---|---|---|---|---|---|---|---|---|---|
| 1. Spare | $\phi$ | $\phi$ | $\phi$ | $\phi$ | $\phi$ | $\phi$ | $\phi$ | 1 | X | X | X | X | | SPARE | | | |
| 2. Scan RCV Status | | | CH # | | $\phi$ | 1 | $\phi$ | | X | X | X | X | X | X | X | X | |
| 3. Update RCV Status | | | CH # | | $\phi$ | 1 | 1 | | X | X | X | X | T | $C_2$ | $C_1$ | $C_0$ | |
| 4. Scan XMT Status | | | CH # | | 1 | $\phi$ | $\phi$ | | X | X | X | X | X | X | X | 1 | |
| 5. Update XMT Status | | | CH # | | 1 | $\phi$ | 1 | | X | X | X | X | | SPARE | | S | |
| 6. Voice | | | CH # | | 1 | 1 | [$\phi$] | | B1 | B2 | B3 | B4 | B5 | B6 | B7 | B8 | |
| 7. Voice | | | CH # | | 1 | 1 | [1] | | B1 | B2 | B3 | B4 | B5 | B6 | B7 | B8 | |

PARITY ↑ RCV VOICE

| STATES | XMT COMMAND | (ST TO SSC) | XMT DATA |
|---|---|---|---|
| 0. Scan Alarms | $\phi$ $\phi$ $\phi$ $\phi$ $\phi$ $\phi$ $\phi$ $\phi$ | ST # | ALARMS |
| 1. Spare | $\phi$ $\phi$ $\phi$ $\phi$ $\phi$ $\phi$ $\phi$ 1 | ST # | SPARE |
| 2. Scan RCV Status | CH # $\phi$ 1 $\phi$ | ST # | T $C_2$ $C_1$ $C_2$ |
| 3. Update RCV Status | CH # $\phi$ 1 1 | ST # | T $C_2$ $C_1$ $C_0$ |
| 4. Scan XMT Status | CH # 1 $\phi$ $\phi$ | ST # | B A S |
| 5. Update XMT Status | CH # 1 $\phi$ 1 | ST # | B A S |
| 6. Voice | CH # 1 1 [$\phi$] | | B1 B2 B3 B4 B5 B6 B7 B8 |
| 7. Voice | CH # 1 1 [1] | | B1 B2 B3 B4 B5 B6 B7 B8 |

PARITY ↑ XMT VOICE

The SSC's use time slots 23 and 47 for control functions. All other time slots are used for voice functions. The RCV COMMAND bus is used to execute both control and voice functions. In Table I, the three LSB's contain the command to be executed. States $\phi$ through 5 are control commands and states 6 and 7 are voice commands. The five MSB's contain the channel unit number (when needed) to be processed.

On voice functions the command code will be either a 6 or 7 depending on the parity associated with the data byte. The RCV DATA byte is stored in memory (with parity) at the address defined by the 5 MSB's of the RCV COMMAND byte. The XMT DATA byte is retrieved from the same memory location and returned to the SSC that initiated the voice command. At the same time the XMT COMMAND byte is returned to the SSC. The XMT COMMAND byte is identical to the RCV COMMAND byte except for a possible parity difference. The information for the XMT COMMAND byte is obtained from an internal point such that as much circuitry as possible is checked.

Control functions are processed in similar fashion except there may or may not be a RCV DATA byte to be processed. This is dictated by the command code. In any case, the XMT COMMAND byte is composed of 4 bits representing the ST number and the 4 bits of memory that are of interest to the SSC. This provides a means of identification to the SSC. In general, an SSC will either be scanning or updating the ST memory. When updating, the memory bits returned to the SSC will always be the new memory bits.

The subscriber terminals each include 96×10 bit memory 316 formed by MOS static RAMS, which were employed because of lowest cost, lowest power consumption, and minimum space requirements.

Each time slot consists of eight 324 ns bit times. Processing intervals are divided up as follows:

| Bit Time | Memory Operation |
|---|---|
| 4-5 | Exchange data bytes with bus $\phi$ |
| 6-7 | Exchange data bytes with bus 1 |
| 0-3 | Even time slots: Exchange voice bytes with channel unit encoder and decoder. |
| 0-3 | Odd time slots: Exchange status bytes with channel units. |

These memories are just fast enough to execute a read-modify-write cycle in 648 ns.

For ease of handling, the status parity bit has been moved from the bit 8 position to the bit 7 position in memory.

Each subscriber line is allocated four words in memory or channel units. Words 1 and 2 are for RCV and XMT voice data. Words 3 and 4 are for RCV and XMT status data.

During odd time slots, the RCV status bits are loaded into a corresponding channel unit (CU) buffer. In Table I, the "T" bit is allowed to control the selection of the XMT voice byte. Thus, when a path test is enabled, the "T" selects voice bytes from the input to the D to A (decoder) circuit instead of the A to D (encoder) circuit output. A closed loop voice path is established for that channel unit allowing loop testing of voice bits. The path test will continue until disabled by the SSC.

In Table I, $C_0$, $C_1$, and $C_2$ represent 1 out of 8 possible actions to be executed at the channel unit. One of these is a "do nothing" state while the other seven are selected for the individual needs of the various types of channel units (e.g., ringing, test). During odd time slots, this data is stored in the appropriate channel unit. Thus the channel units are each updated once per frame to keep "fresh" data in the channel unit registers.

Channel units are scanned for the state of the outgoing A and B bits at the same time that the RCV signaling is stored. The memory is updated with the current A and B status. Whenever an off hook occurs, the A bit changes from a $\phi$ to a 1. The next scan by an SSC causes the S bit to be set to a 1, thus marking the fact that an off hook has been detected by an SSC. The SSC subsequently sets the S bit back to zero when the call is complete.

During frame 6 and 12, A and B bits (respectively), are inserted in the B8 position of XMT voice data.

Referring to FIG. 9, a plurality of subscriber telephone lines 14-1 to 14-24 are connected to line interface units (LIU) 301. Each LIU unit 301 is a well known unit for converting analog signals on the telephone subscriber lines to a pulse amplitude modulated (PAM) format and inputs the PAM data into a codec 302. The LIU 301 units also receive PAM signals from a codec 302 for converting to analog format and connection to the respective subscriber line.

Referring to FIG. 10, a block diagram for a line interface unit is shown in which the subscribers tip and ring lines 14 are input to a hybrid junction circuit 303 and balance network 304, which achieve a desired balancing effect by the transmission of the signal through the transmit and receive filters 305, 306, respectively, and converting a subscriber's analog signal into a pulse amplitude modulated (PAM) format. The receive filter 306 is appropriately balanced so that undesired signals are not transmitted down the receive bus 347. The hybrid junction 303 includes a relay contact which detects the dial pulses from a subscriber line using conventional rotary techniques. The LIU also includes logic circuitry 307 for manipulating the A & B signaling bits through techniques well known in the art to inform the system of a subscriber going off hook and detection of dial pulses. The system will accordingly instruct a line interface unit 302 to activate the necessary ringing functions by appropriate control signals.

Referring again to FIG. 9, the PAM data from line interface units 301 are multiplexed into codec 302 via buses 345 or 348. Each codec includes a digital to analog converter such as Precision Monolithics DAC-76 or Signetics ST-100, which are $\mu$-255 law companding converters with appropriate logic circuitry for converting data between PAM and PCM format. Each codec 302 handles up to 12 channels for encoding and decoding and making a full A/D conversion every 10.4 microseconds. The codec 302-1, 302-2 in each subscriber terminal multiplex the 24 subscriber lines 14-1 to 14-24 into PCM format for connection onto a 8-bit bidirectional data bus 313. Similarly, the codec 302-1, 302-2 receive PCM data via 8-bit data bus 314.

The data on bus 313 is input to a read-modify write circuit 315, which includes conventional selector circuits (LS 253). The circuit 315 is connected to the 96X10 bit memory 316 for appropriately storing the data corresponding to the subscriber lines 14.

The timing diagram for a subscriber terminal is shown in FIG. 11, in which the command and data buses are 48 time slots (0-47) buses and in which the receive data (SSC to ST) leads the transmit data (ST to SSC) by two time slots. The system is controlled by a system master clock of 3.088 Mhz, operative in a multiframe format of 12 frames, where signaling frames occur during the sixth and twelfth frames, as previously described. In FIG. 11, the expanded time slot signals are shown occurring at the end of frame 5 and the beginning of frame 6. The receive data leads the transmit data by two time slots in order to allow the subscriber terminal to receive the data, process it, and transmit it in successive time slots.

Data to be transmitted to either a Codec 302 or an SSC is read out of memory 316 to Data buses 314 or 317. Similarly, data to be written into memory 316 from either codec 302 or an SSC in input via buses 313 or 318 through read-modify write circuit 315. The A and B signaling bits from the LIU's 301 are input to circuit 315 on bus 363. The signaling bits are to be connected to the LIU's 301 and are connected from buffer 337 via bus 365 to RSB decode circuit 362 (typically LS 319) and to the LIU's 301 via bus 364. In FIG. 9, the particular buses from an SSC are described as follows. The transmit data bus 113-2 and receive data bus 113-1 correspond to bus 113 of FIG. 4. Similarly, buses 108-2, 108-1; 112-2, 112-1; and 109-2, 109-1 correspond to the respective buses in FIG. 4.

Serial data from an SSC such as SSC-0 on bus 113-1 is converted to 8 bit format on bus 318 and input to memory 316 through circuit 315 and bus 319.

The memory 316 into which data is to be written is addressed during a receive cycle by the RCV command data on bus 112-1 or 109-1, which is input through register 326 onto buses 353, 30, where the bus format in Table I uses the 5 higher-order bits to address memory 316, which corresponds to the appropriate channel number. The data on data bus 319 is then written into memory 316 at the location corresponding to the appropriate subscriber line 14. When counter 331 counts to the time slot corresponding to the appropriate subscriber line, it addresses memory 316 and the data is then read on bus 314 for connection through codec 302 and a line interface unit 301 to the appropriate subscriber line.

During a transmission cycle from an ST to a particular SCC, the data from a codec 302 is input on bus 313 through circuit 315 to memory 316 in a location corresponding to the subscriber line (addressed by counter 331). The data is then read out of memory 315 onto bus 317 for connection to the appropriate SSC at the time addressed by the SSC.

It can be seen, therefore, that the subscriber terminal is capable of a time slot interchanger function by connecting the subscriber lines 1-24 to any of the time slots to either of the SSC's, as long as a time slot is available. The subscriber could be connected to either of the T-1 lines, 22, 23 of FIG. 4 without blocking, as long as those time slots were available.

The selector circuit 332 selects the clocking signals from the clock generators of both SSC's and performs conventional clock detecting and clock searching techniques to insure that a clock signal is provided to the subscriber terminal. Selector 332 provides the CLK, FS, and F6/12 signals on buses 338, 337, 358, respectively. The counter 331 is counting in response to the clock signals and is used for addressing in conjunction with control circuit 335.

The memory control circuit 335 utilizes three PROM's storing the data as set forth in Table II to provide appropriate enabling signals on buses 343, 344, 356, 359 for the subscriber terminal when addressed by counter 331 during the cycles of operation. The buffer 337 is utilized for updating the read-modify write circuit 315 under control of the SSC. For example, in order to update the state of the A and B bits, the old byte containing the A & B bits is routed through buffer 337 via bus 351 into circuit 315, which substitutes the new A & B bits from the LIU's into the appropriate bit positions and then writes the whole byte back into the selected location in memory 316.

TABLE IIA

| Octal Address | 8 | 7 | 6 | 5 | 4 | 3 | 2 | 1 | Decimal Address |
|---|---|---|---|---|---|---|---|---|---|
| φ | 1 | φ | φ | 1 | 1 | 1 | 1 | φ | φ |
| 1 | 1 | φ | φ | 1 | 1 | 1 | 1 | 1 | 1 |
| 2 | 1 | φ | 1 | φ | φ | φ | 1 | 1 | 2 |
| 3 | 1 | φ | φ | φ | φ | 1 | 1 | φ | 3 |
| 4 | 1 | φ | φ | φ | φ | 1 | 1 | 1 | 4 |
| 5 | 1 | φ | φ | φ | φ | 1 | 1 | 1 | 5 |
| 6 | 1 | φ | φ | φ | φ | 1 | 1 | 1 | 6 |
| 7 | 1 | φ | φ | φ | φ | 1 | φ | 1 | 7 |
| 1φ | 1 | φ | φ | φ | φ | 1 | φ | 1 | 8 |
| 11 | 1 | 1 | φ | φ | φ | 1 | 1 | 1 | 9 |
| 12 | 1 | 1 | φ | φ | φ | 1 | 1 | 1 | 10 |
| 13 | 1 | 1 | 1 | φ | φ | 1 | 1 | 1 | 11 |
| 14 | 1 | 1 | 1 | φ | φ | 1 | 1 | 1 | 12 |
| 15 | 1 | φ | φ | 1 | φ | 1 | 1 | 1 | 13 |
| 16 | 1 | φ | φ | 1 | φ | 1 | 1 | 1 | 14 |
| 17 | 1 | φ | φ | 1 | 1 | 1 | φ | φ | 15 |
| 2φ | 1 | φ | φ | 1 | 1 | 1 | 1 | 1 | 16 |
| 21 | 1 | φ | φ | 1 | 1 | 1 | 1 | 1 | 17 |
| 22 | 1 | φ | φ | 1 | 1 | 1 | 1 | φ | 18 |
| 23 | 1 | φ | φ | 1 | 1 | 1 | 1 | 1 | 19 |
| 24 | 1 | φ | φ | 1 | 1 | 1 | 1 | 1 | 20 |
| 25 | 1 | φ | φ | 1 | 1 | 1 | 1 | φ | 21 |
| 26 | 1 | φ | φ | 1 | 1 | 1 | 1 | 1 | 22 |
| 27 | 1 | φ | φ | 1 | 1 | 1 | φ | 1 | 23 |
| 3φ | φ | φ | φ | 1 | 1 | 1 | 1 | φ | 24 |
| 31 | φ | φ | φ | 1 | 1 | 1 | 1 | 1 | 25 |
| 32 | φ | φ | φ | 1 | 1 | 1 | 1 | 1 | 26 |
| 33 | φ | φ | φ | 1 | 1 | 1 | 1 | φ | 27 |
| 34 | 1 | φ | φ | 1 | 1 | 1 | 1 | 1 | 28 |
| 35 | 1 | φ | φ | 1 | 1 | 1 | 1 | 1 | 29 |
| 36 | 1 | φ | φ | 1 | 1 | 1 | 1 | φ | 30 |
| 37 | 1 | φ | φ | 1 | 1 | 1 | φ | 1 | 31 |

TABLE IIB

| Octal Address | 8 | 7 | 6 | 5 | 4 | 3 | 2 | 1 | Decimal Address |
|---|---|---|---|---|---|---|---|---|---|
| φ | φ | 1 | φ | 1 | 1 | φ | φ | φ | φ |
| 1 | 1 | φ | 1 | 1 | 1 | φ | φ | φ | 1 |
| 2 | 1 | 1 | φ | 1 | 1 | φ | φ | φ | 2 |
| 3 | 1 | φ | 1 | 1 | 1 | φ | φ | φ | 3 |
| 4 | φ | φ | φ | φ | φ | φ | φ | φ | 4 |
| 5 | φ | φ | φ | φ | φ | φ | φ | φ | 5 |
| 6 | φ | φ | φ | φ | φ | φ | φ | φ | 6 |
| 7 | φ | φ | φ | φ | φ | φ | φ | φ | 7 |
| 1φ | φ | 1 | φ | 1 | 1 | 1 | φ | 1 | 8 |
| 11 | 1 | 1 | 1 | 1 | 1 | 1 | φ | 1 | 9 |
| 12 | φ | 1 | φ | 1 | 1 | 1 | φ | 1 | 10 |
| 13 | 1 | 1 | 1 | 1 | 1 | 1 | φ | 1 | 11 |
| 14 | φ | φ | φ | φ | φ | φ | φ | φ | 12 |
| 15 | φ | φ | φ | φ | φ | φ | φ | φ | 13 |
| 16 | φ | φ | φ | φ | φ | φ | φ | φ | 14 |
| 17 | φ | φ | φ | φ | φ | φ | φ | φ | 15 |
| 2φ | φ | 1 | φ | 1 | 1 | 1 | 1 | 1 | 16 |
| 21 | 1 | φ | 1 | 1 | φ | 1 | 1 | 1 | 17 |
| 22 | φ | 1 | φ | 1 | 1 | 1 | 1 | 1 | 18 |
| 23 | 1 | φ | 1 | 1 | φ | 1 | 1 | 1 | 19 |
| 24 | φ | φ | φ | φ | φ | φ | φ | φ | 20 |
| 25 | φ | φ | φ | φ | φ | φ | φ | φ | 21 |
| 26 | φ | φ | φ | φ | φ | φ | φ | φ | 22 |
| 27 | φ | φ | φ | φ | φ | φ | φ | φ | 23 |
| 3φ | 1 | 1 | 1 | 1 | 1 | φ | 1 | 1 | 24 |
| 31 | 1 | φ | 1 | 1 | 1 | φ | 1 | 1 | 25 |
| 32 | 1 | 1 | 1 | 1 | 1 | φ | 1 | 1 | 26 |
| 33 | 1 | φ | 1 | 1 | 1 | φ | 1 | 1 | 27 |
| 34 | φ | φ | φ | φ | φ | φ | φ | φ | 28 |
| 35 | φ | φ | φ | φ | φ | φ | φ | φ | 29 |
| 36 | φ | φ | φ | φ | φ | φ | φ | φ | 30 |
| 37 | φ | φ | φ | φ | φ | φ | φ | φ | 31 |

TABLE IIC

| Octal Address | 8 | 7 | 6 | 5 | 4 | 3 | 2 | 1 | Decimal Address |
|---|---|---|---|---|---|---|---|---|---|
| φ | φ | 1 | 1 | φ | φ | φ | φ | 1 | φ |
| 1 | 1 | 1 | 1 | 1 | 1 | φ | φ | 1 | 1 |
| 2 | φ | 1 | 1 | φ | φ | φ | φ | 1 | 2 |
| 3 | 1 | 1 | 1 | 1 | 1 | φ | φ | 1 | 3 |
| 4 | φ | φ | φ | φ | φ | φ | φ | φ | 4 |
| 5 | φ | φ | φ | φ | φ | φ | φ | φ | 5 |
| 6 | φ | φ | φ | φ | φ | φ | φ | φ | 6 |
| 7 | φ | φ | φ | φ | φ | φ | φ | φ | 7 |
| 1φ | φ | 1 | φ | 1 | 1 | 1 | φ | 1 | 8 |
| 11 | 1 | 1 | 1 | 1 | 1 | 1 | φ | 1 | 9 |
| 12 | φ | 1 | φ | 1 | 1 | 1 | φ | 1 | 10 |
| 13 | 1 | 1 | 1 | 1 | 1 | φ | φ | 1 | 11 |
| 14 | 1 | φ | 1 | 1 | 1 | 1 | φ | 1 | 12 |
| 15 | φ | 1 | φ | 1 | 1 | 1 | φ | 1 | 13 |
| 16 | 1 | φ | 1 | 1 | 1 | 1 | φ | 1 | 14 |
| 17 | φ | 1 | φ | 1 | 1 | 1 | φ | 1 | 15 |
| 2φ | φ | 1 | φ | φ | 1 | 1 | 1 | 1 | 16 |
| 21 | 1 | φ | 1 | φ | 1 | 1 | 1 | 1 | 17 |
| 22 | φ | 1 | φ | φ | 1 | 1 | 1 | 1 | 18 |
| 23 | 1 | 1 | 1 | φ | 1 | 1 | 1 | 1 | 19 |
| 24 | φ | 1 | φ | φ | 1 | 1 | 1 | 1 | 20 |
| 25 | φ | φ | 1 | φ | 1 | 1 | 1 | 1 | 21 |
| 26 | φ | 1 | φ | φ | 1 | 1 | 1 | 1 | 22 |
| 27 | φ | φ | 1 | φ | 1 | 1 | 1 | 1 | 23 |
| 3φ | 1 | φ | 1 | 1 | 1 | φ | φ | φ | 24 |
| 31 | φ | 1 | φ | 1 | 1 | φ | 1 | φ | 25 |
| 32 | 1 | φ | 1 | 1 | 1 | φ | φ | φ | 26 |
| 33 | φ | 1 | φ | 1 | 1 | φ | 1 | φ | 27 |
| 34 | 1 | φ | 1 | 1 | 1 | φ | φ | φ | 28 |
| 35 | φ | 1 | φ | 1 | 1 | φ | 1 | φ | 29 |
| 36 | 1 | φ | 1 | 1 | 1 | φ | φ | φ | 30 |
| 37 | φ | 1 | φ | 1 | 1 | φ | 1 | φ | 31 |

Referring now to Tables IIA–IIC, these tables depict the variable memory control outputs of memory control circuit 335 of FIG. 9. The instructions for each table are stored in conventional 32×8 PROMs (S288). Briefly, the particular outputs of the PROMs depicted in Tables IIA–IIC are as follows.

The PROM containing Table IIA is addressed in FIG. 9 by five bits from counter 331 via bus 341. In Table IIA, the Y8 output is an address select signal for decoding and encoding functions. For example, circuit 315 includes a selector circuit (LS257A) for selecting via the Y8 output the particular subscriber terminal number (hardwired) or the data on bus 350. The Y7 and Y6 outputs are utilized for receiving the signaling bits from LIU units 301. The Y5 output is a hold sample signal for use by a sample and hold circuit typical in any codec circuit. The Y4 output is an encode enable signal for encoding and decoding the codecs 302 of FIG. 9. The Y3 output is a start signal used, for example, as a shift load signal. The Y2 output is a transmit load signal for transmitting data to a particular subscriber switch controller. The Y1 output is a successive approximation register clock enable signal which is utilized in the codec circuitry.

The PROM containing Table IIB is addressed by four bits (inputs A, B. D, E) from counter 331 (the C input is wired high). The outputs for Table IIB are as follows. The Y8 output is a transmit register enable for controlling both the transmit registers of FIG. 8 via bus 359. The Y7 is a write signal for writing data to the memory 316 via bus 366. The Y6 is a memory read enable signal. The Y5 and Y4 outputs are select signals used by the read modify write circuit 315, which typically includes LS253 selectors. The Y3 and Y2 outputs are word select signals for selecting the low order bits in the memory 316 via bus 366.

The PROM containing Table IIC is generally addressed by the command code signals illustrated in Table I and has the same output functions as for Table IIB, except for the Y1 output, which is a voice time slot signal.

In order to more clearly describe the operation of the system, a cycle of operation for connection of one subscriber line to another will be now explained.

Assume that a subscriber, such as subscriber S-12 goes off-hook and intends to make a call. The associated line interface unit 301-12 of FIG. 9 will detect the off-hook condition and inform the read modify write circuit 315 which will then store this status in word location 3 (transmit status byte) of channel unit 12 in memory 316 (channel unit 12 corresponds to subscriber 12). Both of the SSC's are scanning for the status of the particular subscriber lines and within a short period of time one of the SSC's will instruct the subscriber terminal for subscriber 12 to return the status of subscriber line 12. At this time the SSC, say SSC $\phi$, will send a receive command during control time slots 23 or 47 to SCAN the status of subscriber line 12. The delayed time slots for the transmit response (two time slots) will enable the ST to inform the SSC that subscriber 12 has gone off hook by returning the updated transmit status byte. At this time, the S bit is set to a 1 thus marking the fact that an off hook has been detected by an SSC. The SSC will subsequently set the S bit back to $\phi$ when the call is complete.

When an SSC has been informed of the off-hook condition by the subscriber terminal, the information is loaded into the scan data register 145 of FIG. 10 and connected to the processor, and the SSC sends a message to the base switch 10 via the T-1 line 22-2 by loading the message register 142 shown in FIG. 8, which at the appropriate time connects the message to the T-1 line 22-2, which is then sent to the base switch 10. The base switch 10 will receive the signal via the communications processor 40, which has been described in FIG. 3. When the base switch has been informed of the off-hook change, it will instruct the SSC, via the communication processor 40, to connect the subscriber line 12 to a time slot on T-1 line 22, say for example, time slot 20.

In FIG. 2, the system controller 50 will instruct the service generator 43 to connect dial tone to the assigned time slot on the T-1 line (time slot 20). The corresponding internal time slot between the ST and the SSC could be in one embodiment any even time slot, say, for example time slot 40. The SSC will then connect the subscriber line 12 to internal time slot 40 to make the interconnections for data going out to the base switch. When the service generator 23 connects the dial tone to subscriber 12, the data is in PCM format and will be connected to the subscriber terminal during the assigned time slot, which is in this instance time slot 40 and stored in memory 316 at the corresponding channel unit. In FIG. 9, the receive command bus such as bus 112-1 will address memory 316 via buses 353, 330 at the channel number location for indicating which command is to be executed. The receive data bus will carry the data into the memory 316 at that time. In order to connect the PCM data representing the dial tone to the subscriber 12, the counter 331 will address memory 316 during subscriber time slot 12 and connect, via buses 319 and 314, the data to codec 302-1 which converts the data to a pulse amplitude modulated (PAM) format and connects it to the line interface unit 301-12. The line interface unit 301-12 will convert the data through conventional techniques to an analog format and connect the dial tone to the subscriber line 12. The subscriber begins dialing and the dialing information is transmitted to the base switch 10 where a translation table is addressed with the dialing data in order to make the proper connections. Voice data during the assigned time slots will be occurring as described with the data being transmitted and received under the states 6 and 7 as described previously.

For a call to a subscriber line, the base switch 10 will be informed of such an incoming call and will instruct, through the communications processor 40, an SSC such as SSC $\phi$ to make connection between a desired subscriber line, if it is not busy, and the incoming call. The communications processor transmitter will send a message as previously described to the SSC to inform it of an incoming call. The SSC will instruct the appropriate subscriber terminal to ring the particular subscriber line, say subscriber line 1, and when the subscriber answers, connections are made for transmitting and receiving the calls between the calling and called parties in the form previously described.

What is claimed is:

1. In a telephone system operating in a time frame format consisting of a plurality of time slots, said system including a base switch connected to a plurality of multitime slot buses for switching data between one time slot and any other time slot on any of said buses and including a subscriber switch connected to a plurality of local subscriber lines and to a pair of said buses for connecting said subscriber lines to specified time slots on said pair of buses, said subscriber switch including a subscriber terminal comprising:

codec means connected to said plurality of subscriber lines for encoding and multiplexing data on said subscriber lines into a time frame corresponding to said time frame format, memory means having a plurality of channel units, each unit corresponding to one of said subscriber lines, means for writing the encoded data from said codec means into said corresponding channel units, means for reading said encoded data from said channel units onto time slots on said pair of buses specified by said base switch thereby switching said encoded data to said specified time slots, said means for writing including means for writing other encoded data from other specified time slots on said pair of buses into other channel units corresponding to subscriber lines specified by said base switch, said means for reading including means for reading said other encoded data from said other channel units into said codec means, said codec means including means for decoding and demultiplexing said other encoded data thereby switching the decoded data to the specified subscriber lines.

2. The terminal of claim 1 wherein said means for writing includes a first write multitime slot data bus connected to said codec means for carrying said encoded data from said codec means to said channel units in time slots corresponding to each one of said subscriber lines and a second write multitime slot data bus connected to said pair of buses for carrying said other encoded data to said other channel units.

3. The terminal of claim 2 wherein means for reading includes a first read multitime slot data bus connected to said memory means and said pair of buses for carrying said encoded data from said memory means to said pair of buses in time slots specified by said base switch and a second read multitime slot data bus connected to said memory means and to said codec means for carrying said other encoded data from said memory means to said codec means in time slots corresponding to said specified subscriber lines.

4. The terminal of claim 3 wherein said means for reading and said means for writing include memory control means for addressing said channel units at the specified locations during the said time frame.

5. The terminal of claim 4 wherein said memory control means include counter means for addressing said memory means during the reading of said channel units.

6. The terminal of claim 4 wherein said memory control means include read only memory means containing predetermined instructions for receiving control signals specifying the time slots, whereby said read only means addresses said memory means at the specified time slots during the reading of said channel units.

7. The terminal of claim 6 further including first and second transmit data registers for connecting the encoded data to one of said pair of buses.

8. The terminal of claim 7 further including a first transmit command register for receiving said control signals specifying the connection of said encoded data to one of said pair of buses and a second transmit command register for receiving said control signals specifying the connection of the encoded data to the other of said pair of buses.

9. The terminal of claim 6 further including first and second receive data registers for receiving said other encoded data from one of said pair of buses.

10. The terminal of claim 9 further including a first receive command register for receiving control signals specifying the connections of the other encoded data from one of said pair of buses and a second receive command register for receiving control signals specifying the connections of the other encoded data from the other of said pair of buses.

11. In a telephone system operating in a time frame format consisting of a plurality of time slots, said system including a base switch connected to a plurality of multitime slot buses for switching data between one time slot on any of said buses and including a subscriber switch connected to a plurality of local subscriber lines and to a pair of said buses for connecting said subscriber lines to specified time slots on said pair of buses, said subscriber switch including a subscriber terminal comprising:

a first write multitime slot data bus,
codec means connected to said plurality of subscriber lines and to said first write bus for encoding and multiplexing data on said subscriber lines onto said first bus in a time frame corresponding to said time frame format,
memory means having a plurality of channel units, each unit corresponding to one of said subscriber lines,
means for writing the encoded data on said first write bus into said corresponding channel units,
a first read multitime slot data bus,
means for reading the encoded data from said channel units onto time slots on said first read bus specified by said base switch for connecting said subscriber lines to said specified time slots,
means for connecting said first read data bus to one of said plurality of buses,
a second write multitime slot data bus,
means for connecting encoded data on said plurality of buses to said second write data bus,
said means for writing including means for writing said other encoded data on said second write bus into another corresponding channel unit,
a second read multitime slot data bus connected to said codec means and to said memory means,
said means for reading including means for reading said encoded data from said another channel unit onto corresponding time slots on said second read bus, said codec means including means for decoding and demultiplexing said data on said second read bus for connecting said data to the corresponding subscriber lines.

12. In a telephone system operating in time frames consisting of a plurality of time slots, a subscriber terminal comprising:

codec means connected to a plurality of subscriber lines for encoding and multiplexing data on said subscriber lines into a time frame corresponding to said time frame format,
memory means having a plurality of channel units, each unit corresponding to one of said subscriber lines,
means for writing the encoded data from said codec means into said corresponding channel units,
means for reading said encoded data from said channel units onto specified time slots on a pair of multitime slot data buses,
said means for writing including means for writing other encoded data from other specified time slots on said pair of buses into channel units corresponding to said subscriber lines,
said means for reading including means for reading said other encoded data from said other channel units into said codec means,
said codec means including means for decoding and demultiplexing said other encoded data thereby connecting the decoded data to said subscriber lines.

* * * * *